(12) United States Patent
Onozaki et al.

(10) Patent No.: US 10,175,595 B2
(45) Date of Patent: Jan. 8, 2019

(54) TONER

(71) Applicant: CANON KABUSHIKI KAISHA, Tokyo (JP)

(72) Inventors: Yuto Onozaki, Saitama (JP); Takeshi Hashimoto, Moriya (JP); Ichiro Kanno, Kashiwa (JP); Megumi Ikeda, Kashiwa (JP); Masayuki Hama, Toride (JP); Nozomu Komatsu, Toride (JP); Akifumi Matsubara, Narashino (JP); Hitoshi Sano, Matsudo (JP); Takakuni Kobori, Toride (JP); Hayato Ida, Toride (JP); Hiroyuki Fujikawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/813,713

(22) Filed: Nov. 15, 2017

(65) Prior Publication Data

US 2018/0149990 A1    May 31, 2018

(30) Foreign Application Priority Data

Nov. 25, 2016 (JP) ................. 2016-228852

(51) Int. Cl.
*G03G 9/087* (2006.01)
*C08L 47/00* (2006.01)

(52) U.S. Cl.
CPC .......... *G03G 9/08737* (2013.01); *C08L 47/00* (2013.01)

(58) Field of Classification Search
CPC ................ G03G 9/09307; G03G 9/09321
See application file for complete search history.

(56) References Cited

U.S. PATENT DOCUMENTS

| | | | |
|---|---|---|---|
| 5,424,810 A | 6/1995 | Tomiyama et al. |
| 5,464,722 A | 11/1995 | Tomiyama et al. |
| 5,700,616 A | 12/1997 | Kasuya et al. |
| 5,712,073 A | 1/1998 | Katada et al. |
| 5,968,701 A | 10/1999 | Onuma et al. |
| 5,972,553 A | 10/1999 | Katada et al. |
| 6,002,895 A | 12/1999 | Kasuya et al. |
| 6,007,957 A | 12/1999 | Kobori et al. |
| 6,020,102 A | 2/2000 | Fujimoto et al. |
| 6,120,961 A | 9/2000 | Tanikawa et al. |
| 6,156,471 A | 12/2000 | Kobori et al. |
| 6,203,959 B1 | 3/2001 | Tanikawa et al. |

(Continued)

FOREIGN PATENT DOCUMENTS

| | | | | |
|---|---|---|---|---|
| JP | 04-174861 | * | 6/1992 | ............ G03G 9/08 |
| JP | H07271096 A | | 10/1995 | |

(Continued)

OTHER PUBLICATIONS

Translation of JP 04-174861 published Jun. 1992.*

(Continued)

*Primary Examiner* — Peter L Vajda
(74) *Attorney, Agent, or Firm* — Venable LLP

(57) ABSTRACT

Provided is a toner including a toner particle that contains a toner base particle containing a binder resin and a wax, and a coating layer containing a 1,2-polybutadiene resin at the surface of the toner base particle, wherein the coverage ratio of the toner base particle by the coating layer is at least 50%.

7 Claims, 2 Drawing Sheets

(56) References Cited

U.S. PATENT DOCUMENTS

| | | |
|---|---|---|
| 6,235,441 B1 | 5/2001 | Tanikawa et al. |
| 6,430,384 B2 | 8/2002 | Hama et al. |
| 6,653,036 B1 | 11/2003 | Tanikawa et al. |
| 6,670,087 B2 | 12/2003 | Fujikawa et al. |
| 6,751,424 B2 | 6/2004 | Komatsu et al. |
| 6,808,852 B2 | 10/2004 | Hotta et al. |
| 6,905,808 B2 | 6/2005 | Itakura et al. |
| 7,112,395 B2 | 9/2006 | Ida et al. |
| 7,135,263 B2 | 11/2006 | Kawakami et al. |
| 7,147,980 B2 | 12/2006 | Itakura et al. |
| 7,147,981 B2 | 12/2006 | Fujikawa et al. |
| 7,279,262 B2 | 10/2007 | Fujikawa et al. |
| 7,288,348 B2 | 10/2007 | Hayami et al. |
| 7,297,455 B2 | 11/2007 | Fujikawa et al. |
| 7,300,733 B2 | 11/2007 | Sugahara et al. |
| 7,361,441 B2 | 4/2008 | Itakura et al. |
| 7,396,626 B2 | 7/2008 | Fujikawa et al. |
| 7,396,629 B2 | 7/2008 | Baba et al. |
| 7,442,478 B2 | 10/2008 | Itakura et al. |
| 7,452,647 B2 | 11/2008 | Hayami et al. |
| 7,611,813 B2 | 11/2009 | Ida et al. |
| 7,855,042 B2 | 12/2010 | Kobori et al. |
| 7,858,283 B2 | 12/2010 | Ishigami et al. |
| 7,875,413 B2 | 1/2011 | Shibai et al. |
| 7,927,775 B2 | 4/2011 | Komatsu et al. |
| 7,939,233 B2 | 5/2011 | Inoue et al. |
| 8,137,886 B2 | 3/2012 | Baba et al. |
| 8,142,972 B2 | 3/2012 | Hotta et al. |
| 8,288,069 B2 | 10/2012 | Fujikawa et al. |
| 8,921,023 B2 | 12/2014 | Baba et al. |
| 8,927,188 B2 | 1/2015 | Naka et al. |
| 8,986,914 B2 | 3/2015 | Fujikawa et al. |
| 9,034,549 B2 | 5/2015 | Shiotari et al. |
| 9,057,970 B2 | 6/2015 | Ida et al. |
| 9,058,924 B2 | 6/2015 | Komatsu et al. |
| 9,063,443 B2 | 6/2015 | Ishigami et al. |
| 9,152,088 B1 | 10/2015 | Kobori et al. |
| 9,348,247 B2 | 5/2016 | Ida et al. |
| 9,348,253 B2 | 5/2016 | Kanno et al. |
| 9,372,420 B2 | 6/2016 | Mizo et al. |
| 9,417,540 B2 | 8/2016 | Hashimoto et al. |
| 9,500,975 B2 | 11/2016 | Sugahara et al. |
| 9,540,483 B2 | 1/2017 | Ida et al. |
| 9,594,323 B2 | 3/2017 | Fujikawa et al. |
| 9,599,920 B2 | 3/2017 | Sugahara et al. |
| 9,651,883 B2 | 5/2017 | Hama et al. |
| 9,665,021 B2 | 5/2017 | Ohtsu et al. |
| 9,665,023 B2 | 5/2017 | Kamae et al. |
| 9,665,026 B2 | 5/2017 | Iwasaki et al. |
| 9,671,707 B2 | 6/2017 | Minagawa et al. |
| 9,696,644 B2 | 7/2017 | Ida et al. |
| 9,778,598 B2 | 10/2017 | Onozaki et al. |
| 2007/0259284 A1 | 11/2007 | Shibai et al. |
| 2009/0246675 A1 | 10/2009 | Nakamura et al. |
| 2010/0028796 A1 | 2/2010 | Nakamura et al. |
| 2010/0183971 A1 | 7/2010 | Fujikawa et al. |
| 2013/0108955 A1 | 5/2013 | Shibata et al. |
| 2013/0244159 A1 | 9/2013 | Ishigami et al. |
| 2014/0030648 A1* | 1/2014 | Miyamoto ......... G03G 9/09321 430/110.2 |
| 2014/0134535 A1 | 5/2014 | Baba et al. |
| 2014/0137428 A1 | 5/2014 | Takenaka et al. |
| 2014/0329176 A1 | 11/2014 | Kanno et al. |
| 2015/0099227 A1 | 4/2015 | Ida et al. |
| 2016/0109820 A1 | 4/2016 | Hashimoto et al. |
| 2016/0306301 A1 | 10/2016 | Sugahara et al. |
| 2016/0363877 A1 | 12/2016 | Hama et al. |
| 2017/0315461 A1 | 2/2017 | Komatsu et al. |
| 2017/0315463 A1 | 2/2017 | Onozaki et al. |
| 2017/0329245 A1 | 11/2017 | Shibata et al. |
| 2017/0343911 A1 | 11/2017 | Hashimoto et al. |

FOREIGN PATENT DOCUMENTS

| | | |
|---|---|---|
| JP | 2007-003840 A | 1/2007 |
| JP | 2007-298869 A | 11/2007 |

OTHER PUBLICATIONS

U.S. Appl. No. 15/532,543, Junichi Tamura, filed Jun. 2, 2017.
U.S. Appl. No. 15/611,865, Ichiro Kanno, filed Jun. 2, 2017.
U.S. Appl. No. 15/687,726, Daisuke Yamashita, filed Aug. 28, 2017.
U.S. Appl. No. 15/693,662, Hayato Ida, filed Sep. 1, 2017.
U.S. Appl. No. 15/730,337, Tomoyo Miyakai, filed Oct. 11, 2017.
U.S. Appl. No. 15/807,766, Yuto Onozaki, filed Nov. 9, 2017.

* cited by examiner

TONER

BACKGROUND OF THE INVENTION

Field of the Invention

The present invention relates to a toner for use in recording methods such as electrophotographic methods, electrostatic recording methods, magnetic recording methods and toner jet methods.

Description of the Related Art

Full-color electrophotographic copiers have become common in recent years, and are now being applied to the printing market. In addition to handling a wide range of media (paper types), copiers for the printing market are now required to have high speeds, high image quality and high productivity.

For example, one requirement is a media-constant speed, meaning that even when the paper type is changed from heavy paper to light paper, printing can be continued without changing the process speed or the heating set temperature of the fixing unit to match the paper type. To achieve a media-constant speed, the toner must be able to properly complete fixing within a wide range of fixation temperatures, from low temperatures to high temperatures. Expanding the fixation temperature range at low temperatures in particular is highly advantageous because it is thus possible to reduce the time (warm-up time) that it takes for the surface of a fixing member such as a fixing roll to reach a fixable temperature when the power supply is connected, or to increase the useful life of the fixing member.

As a means of improving the low-temperature fixability of a toner, Japanese Patent Application Laid-open No. 2007-003840 discloses a toner containing a crystalline polyester with a low melt viscosity in a core, and also containing an amorphous polyester in a shell.

However, the problem is that although the properties of the crystalline polyester give the toner a sharp-melt property and excellent low-temperature fixability, the charging stability is not satisfactory.

This is thought to be because the crystalline polyester has polar groups in the molecule and therefore the toner is likely to absorb moisture and the charge quantity of the toner declines in high-humidity environments.

One way that is known for improving the charging stability of a conventional toner while maintaining its low-temperature fixability is to use a polybutadiene thermoplastic elastomer (Japanese Patent Application Laid-open No. H07-271096).

A toner containing a polybutadiene thermoplastic elastomer has a sharp-melt property and excellent low-temperature fixability. Moreover, the polybutadiene thermoplastic elastomer also provides good charging stability in high-humidity environments because it has low hygroscopicity.

Thus, polybutadiene thermoplastic elastomers have various advantageous that make them useful as binder resins in toners, but the problem is that they have poor adhesiveness with paper because they do not contain polar groups in the molecule. As a result, an image formed from a toner containing a polybutadiene thermoplastic elastomer as a binder resin has poor fixing strength on paper and low glossiness.

To solve this problem, it is known that polyester resins and the like are useful as binder resins for constituting toner particles in order impart high glossiness and obtain printed matter with high image quality (Japanese Patent Application Laid-open No. 2007-298869).

Japanese Patent Application Laid-open No. 2007-298869 discloses a toner having a core-shell structure comprising a coating layer containing a highly hydrophobic cyclic polyolefin resin together with a toner particle containing a synthetic resin such as a polyester resin.

Even though the surface of this toner is coated with a cyclic polyolefin resin having poor fixability on paper and the like, the toner provides a fixed image with good strength and glossiness.

This is thought to be because the cyclic polyolefin resin mixes with the polyester resin under heat and pressure when the toner is fixed. However, this toner has had a problem of charge-up in low-humidity environments. This is attributed to the fact that the toner surface is coated with a non-polar cyclic polyolefin, which makes it difficult for the charge in the toner to be released into the atmosphere.

SUMMARY OF THE INVENTION

The present invention provides a toner that resolves these problems.

Specifically, the present invention provides a toner that has stable charging performance in both high-humidity and low-humidity environments, as well as excellent low-temperature fixability.

The present invention relates to a toner including a toner particle that contains a toner base particle containing a binder resin and a wax, and a coating layer containing a 1,2-polybutadiene resin at the surface of the toner base particle, wherein the coverage ratio of the toner base particle by the coating layer is at least 50%.

Further features of the present invention will become apparent from the following description of exemplary embodiments with reference to the attached drawings.

DESCRIPTION OF THE EMBODIMENTS

Figure 1:
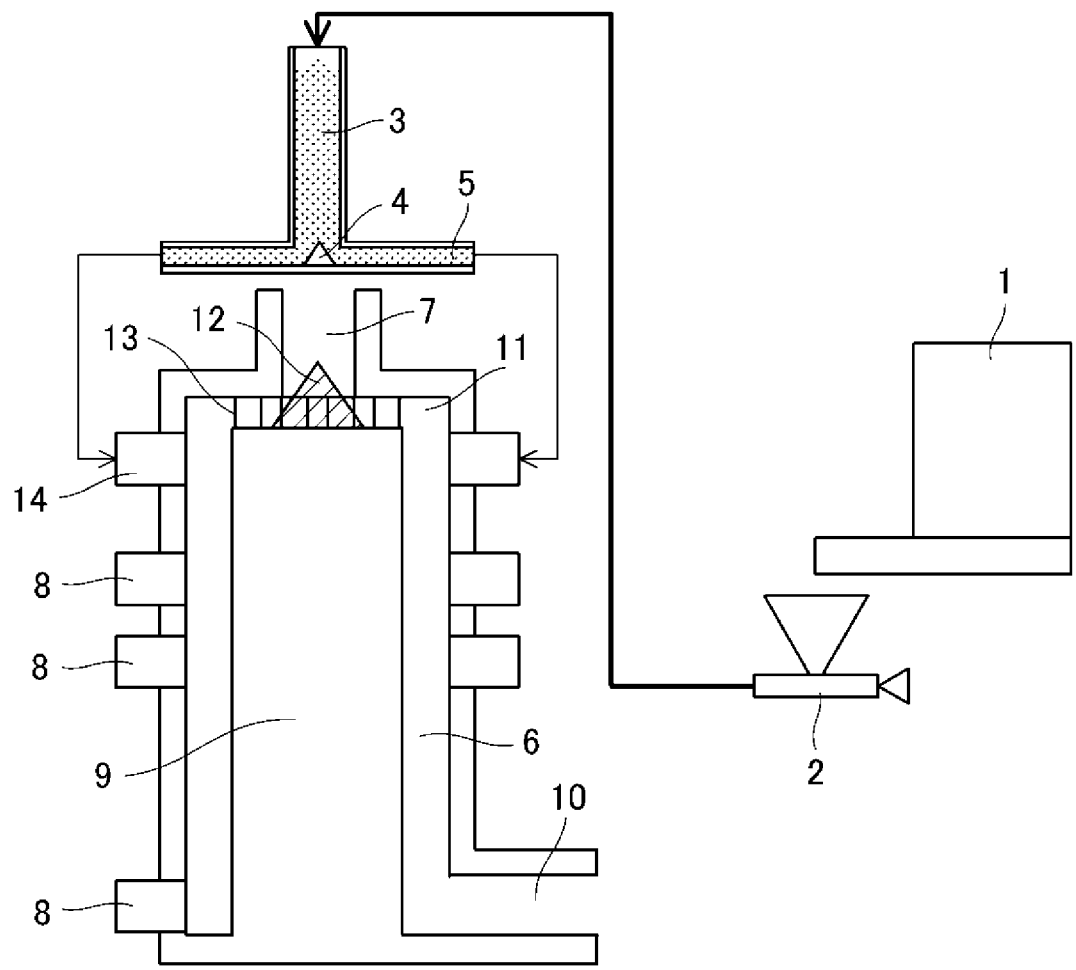
FIG. 1 is a schematic of a heat treatment apparatus.

In the present invention, the terms at least XX and not more than YY and XX to YY, which indicate numerical ranges, mean numerical ranges that include the lower limits and upper limits that are the end points of the ranges.

"Monomer unit" refers to the reacted form of a monomer substance within a polymer or resin.

A crystalline resin is a resin in which an endothermic peak is observed by differential scanning calorimetry (DSC).

Embodiments of the present invention are described below.

The toner of the present invention is a toner including a toner particle that contains a toner base particle containing a binder resin and a wax, and a coating layer containing a 1,2-polybutadiene resin at the surface of the toner base particle, wherein the coverage ratio of the toner base particle by the coating layer is at least 50%.

The present invention was perfected after it was discovered that low-temperature fixability could be improved and charge-up in low-humidity environments could be suppressed by providing a coating layer containing a 1,2-polybutadiene resin at the surface of a toner base particle.

It is thought that the present invention resolves the problems described above for the following reasons.

An effective means of improving low-temperature fixability is to add a crystalline polyester having a plasticizing effect to the binder resin. However, the problem is that although the properties of the crystalline polyester give the toner a sharp-melt property and excellent low-temperature fixability, the charging stability is not satisfactory in high-humidity environments.

The charge quantity of the toner is likely to decline in high-humidity environments because the toner absorbs moisture via the polar groups in the crystalline polyester molecule. This problem is especially likely when the crystalline polyester is located at the toner surface.

When this problem is addressed by coating the toner surface with a non-polar resin, charge-up may occur in low-humidity environments because there are no functional groups to serve as starting points for releasing electrical charge into the air.

Consequently, it is thought that in order to achieve charging stability in both high-humidity and low-humidity environments, it is important that a hydrophobic compound having polar functional groups be present at the toner surface.

The toner particle comprises a toner base particle containing a binder resin and a wax, and a coating layer containing 1,2-polybutadiene resin formed at the surface of the toner base particle.

It is thought that because the 1,2-polybutadiene resin has a low dielectric loss tangent, a suitable amount of charge is released from the 1,2-polybutadiene resin even during long-term use in low-humidity environments, making the toner particle less liable to charge-up.

Moreover, the 1,2-polybutadiene resin also has the property of being highly hydrophobic because it has a hydrocarbon chain in its molecule. As a consequence, it is thought that the toner particle is less likely to absorb moisture and suffer a decline in charge quantity even in high-humidity environments because it has a coating layer containing a 1,2-polybutadiene resin.

The percentage content of the monomer unit represented by Formula (1) below in the 1,2-polybutadiene resin is preferably at least 50 mass %, or more preferably at least 70 mass %, or still more preferably at least 90 mass %, or yet more preferably at least 98 mass %.

The structure of the 1,2-polybutadiene resin may be a 1,2-atactic structure of linked isomers differing randomly as stereoisomers, or a 1,2-isotactic structure in which the linked isomers are all the same, or a 1,2-syndiotactic structure in which the linked isomers alternate with one another. From the standpoint of crystallinity, the percentage content of 1,2-syndiotactic structures in the 1,2-polybutadiene resin is preferably at least 30 mass %, or more preferably at least 50 mass %.

The percentage content of the monomer unit represented by Formula (1) may be measured by ordinary analytic methods. For example, a technique such as nuclear magnetic resonance (NMR) may be used.

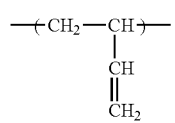
(1)

The 1,2-polybutadiene resin may also contain a monomer unit other than the monomer unit represented by Formula (1). The percentage content of the monomer unit other than the monomer unit represented by Formula (1) is preferably not more than 50 mass %, or more preferably not more than 30 mass %, or still more preferably not more than 10 mass %, or yet more preferably not more than 2 mass % of the 1,2-polybutadiene resin.

The compound forming the monomer unit other than the monomer unit represented by Formula (1) is a compound that can react with the compound forming the monomer unit represented by Formula (1) to form a polymer, and is not particularly limited as long as it does not detract from the effects of the present invention, but from the standpoint of reactivity a desirable example is a conjugated diene.

Examples of the conjugated diene include 1,3-pentadiene and 2-alkyl substituted-1,3-butadienes.

Examples of the 2-alkyl substituted 1,3-butadienes include 2-methyl-1,3-butadiene (isoprene), 2-ethyl-1,3-butadiene, 2-propyl-1,3-butadiene, 2-isopropyl-1,3-butadiene, 2-butyl-1,3-butadiene, 2-isobutyl-1,3-butadiene, 2-pentyl-1,3-butadiene, 2-isoamyl-1,3-butadiene, 2-hexyl-1,3-butadiene, 2-cyclohexyl-1,3-butadiene, 2-isohexyl-1,3-butadiene, 2-heptyl-1,3-butadiene, 2-isoheptyl-1,3-butadiene, 2-octyl-1,3-butadiene and 2-isooctyl-1,3-butadiene.

From the standpoint of low-temperature fixability, the melting point of the 1,2-polybutadiene resin is preferably at least 50° C. and not more than 120° C., or more preferably at least 70° C. and not more than 110° C., or still more preferably at least 70° C. and not more than 100° C.

The melting point of the 1,2-polybutadiene resin can be controlled by varying the molecular weight of the 1,2-polybutadiene resin, and the melting point can be increased by increasing the molecular weight. Specifically, the melting point of the 1,2-polybutadiene resin can be adjusted to within the aforementioned range by giving the 1,2-polybutadiene resin a weight-average molecular weight of about at least 100,000 and not more than 600,000.

The melting point of the 1,2-polybutadiene resin can be measured by differential scanning calorimetry (DSC). Specific measurement methods are described below.

From the standpoint of charging stability and preventing charge-up in low-humidity environments, the dielectric loss tangent of the 1,2-polybutadiene resin is preferably at least 2.0 and not more than 5.0, or more preferably at least 3.0 and not more than 5.0.

The dielectric loss tangent of the 1,2-polybutadiene resin can be adjusted to within this range by changing the composition of the 1,2-polybutadiene resin.

The dielectric loss tangent of the 1,2-polybutadiene resin is measured by the following methods.

1 g of the 1,2-polybutadiene resin is weighed, and 20 kPa of load is applied for 1 minute to mold a disc-shaped measurement sample 25 mm in diameter and 1.5±0.5 mm thick.

This measurement sample is mounted on an ARES (TA Instruments) equipped with a dielectric loss tangent measurement jig (electrode) 25 mm in diameter, and the dielectric loss tangent (tan δ=ε/ε') is calculated from the complex dielectric loss tangent as measured at a frequency of 1,000 Hz with a 4284A Precision LCR Meter (Hewlett-Packard Company) under 250 g/cm² of load at 60% RH, 20° C.

The toner particle comprises a coating layer containing a 1,2-polybutadiene resin, formed at the surface of a toner base particle.

In cross-sectional observation of the toner particle under a transmission electron microscope (TEM), the average thickness of the coating layer is preferably at least 0.1 µm and not more than 2.0 µm, or more preferably at least 0.1 µm and not more than 1.0 µm, or still more preferably at least 0.2 µm and not more than 1.0 µm.

When the average thickness of the coating layer is within this range, the toner particle is less likely to absorb moisture and the charge quantity is less likely to decline even in high-humidity environments because there is little exposure of the toner base particle components.

Even in low-humidity environments, moreover, charge-up of the toner particle is prevented because a suitable degree of charge is released due to the presence of unsaturated double bonds derived from the 1,2-polybutadiene resin contained in the coating layer.

The 1,2-polybutadiene resin is preferably contained in the amount of at least 50 mass %, or more preferably at least 80 mass %, or still more preferably at least 90 mass %, or yet more preferably at least 96 mass % of the coating layer.

When the content of the 1,2-polybutadiene resin in the coating layer is within this range, the toner particle is less likely to suffer charge-up during long-term use in low-humidity environments. In high-humidity environments, on the other hand, it is less likely to absorb moisture and suffer a decline in charge quantity. The coating layer may also contain a known resin other than the 1,2-polybutadiene resin to the extent that this does not affect its physical properties.

In cross-sectional observation of the toner particle under a transmission electron microscope (TEM), the coverage ratio of the toner base particle by the coating layer is at least 50%, or preferably at least 90%, or more preferably at least 95%.

When the coverage ratio of the toner base particle by the coating layer is within this range, moisture absorption by the tone particle is suppressed and the charge quantity is less likely to decline in high-humidity environments because less of the toner base particle is exposed. Even in low-humidity environments, moreover, charge-up of the toner particle is prevented because a suitable degree of charge is released due to the presence of unsaturated double bonds derived from the 1,2-polybutadiene resin at the surface of the toner base particle.

The methods for calculating the average thickness of the coating layer and the coverage ratio by the coating layer are described below.

The 1,2-polybutadiene resin may be coated at the surface of the toner base particle by a known method such as an external addition method, heat treatment method, fluidized bed method or wet method.

In the case of external addition method, a mixing apparatus can be used to electrostatically adsorb the 1,2-polybutadiene resin particles at the surface of the toner base particles, after which the surfaces of the toner base particles can be pressurized by mechanical impact to melt the 1,2-polybutadiene resin and form a coating layer.

The mixing apparatus may be, for example, a Mechano Hybrid (Nippon Coke & Engineering Co., Ltd.), Nobilta (Hosokawa Micron Corporation) or Mechano Fusion system.

In the case of heat treatment method, the 1,2-polybutadiene resin particles can be electrostatically adsorbed at the surface of the toner base particles, and the 1,2-polybutadiene resin can then be melted by heat treatment to form a coating layer.

In the fluidized bed method, a fluidized bed of toner base particles is formed, 1,2-polybutadiene resin particles or a solution of 1,2-polybutadiene resin is spray coated in the fluidized bed, and the solvent contained in the solution is dried to form a coating layer. An SFP series particle coating/granulating apparatus (Powrex Corporation) for example may be used in the fluidized bed method.

Wet methods include the seed (emulsion polymerization) method for example, in which a 1,3-butadiene monomer solution is added to a dispersion of toner base particles, and the 1,3-butadiene monomer solution is polymerized at the surface of the toner base particles to form the coating layer.

In the emulsion aggregation method, a dispersion of 1,2-polybutadiene resin particles is added to a dispersion of toner base particles, and the resin particles are attached to the surface of the toner base particles to form a coating layer. The resulting toner particles can then be isolated from the reaction system by ordinary isolation and purification methods such as filtration, washing with pure water and vacuum drying.

The content of the coating layer is preferably at least 1 mass part and not more than 20 mass parts, or more preferably at least 3 mass parts and not more than 10 mass parts per 100 mass parts of the toner base particle.

Heat treatment is preferably performed with a coating layer containing 1,2-polybutadiene resin present at the surface of the toner base particles. When such heat treatment is performed, the coating layer containing the 1,2-polybutadiene resin is melted and uniformly coats the surface of the toner base particles.

The toner base particle contains a binder resin and a wax.

The binder resin can be selected from conventional known binder resins with the aim of, for example, improving pigment dispersibility in the toner base particle, and improving the charging performance and blocking resistance of the toner particle.

From the standpoint of improving durability, the binder resin preferably contains an amorphous polyester resin as a principal component. The "principal component" here means that the amorphous polyester resin constitutes at least 50 mass % of the binder resin.

The content of the amorphous polyester resin in the binder resin is more preferably at least 60 mass %, or still more preferably at least 70 mass %, or yet more preferably at least 90 mass % of the binder resin, and most preferably the binder resin is an amorphous polyester resin.

Apart from having an amorphous polyester resin as a principal component, the binder resin may also use the resins or polymers given here as examples: monopolymers of styrenes or substituted styrenes, such as polystyrene, poly-p-chlorostyrene and polyvinyl toluene; styrene copolymers such as styrene-p-chlorostyrene copolymer, styrene-vinyl toluene copolymer, styrene-vinyl naphthalene copolymer, styrene-acrylic ester copolymer, styrene-methacrylic ester copolymer, styrene-chloromethyl methacrylate copolymer, styrene-acrylonitrile copolymer, styrene-vinyl methyl ether copolymer, styrene-vinyl ethyl ether copolymer, styrene-vinyl methyl ketone copolymer and styrene-acrylonitrile-indene copolymer; and polyvinyl chloride, phenol resin, natural resin-modified phenol resin, natural resin-modified maleic acid resin, acrylic resin, methacrylic resin, polyvinyl acetate, silicone resin, polyurethane resin, polyamide resin, furan resin, epoxy resin, xylene resin, polyvinylbutyral resin, terpene resin, coumarone-indene resin and petroleum resin.

Examples of monomers used in manufacturing the amorphous polyester resin include polyvalent alcohols (bivalent or trivalent or higher alcohols), polyvalent carboxylic acids (bivalent or trivalent or higher carboxylic acids), or acid anhydrides or lower alkyl esters of these.

Partial crosslinking within the molecule of the amorphous polyester resin is effective when preparing a branched polymer, and a trivalent or higher polyvalent compound is preferred for this purpose.

Consequently, a trivalent or higher carboxylic acid or acid anhydride or lower alkyl ester thereof, and/or a trivalent or higher alcohol may be included as such a raw material monomer when preparing a branched polymer.

Specific examples of the polyvalent alcohol are as follows.

Examples of bivalent alcohols include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, a bisphenol derivative represented by Formula (I) below, a hydrogenated product of Formula (I), and a diol represented by Formula (II) below.

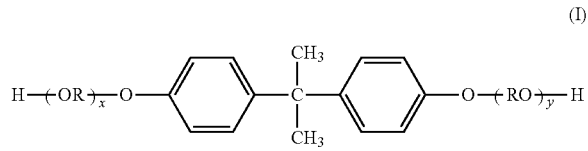

(I)

(In the formula, R is an ethylene or propylene group, each of x and y is an integer equal to or greater than 0, and the average of x+y is at least 0 and not more than 10.)

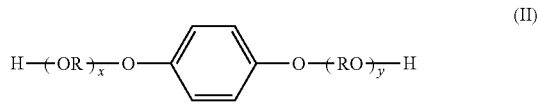

(II)

(In the formula, R' is

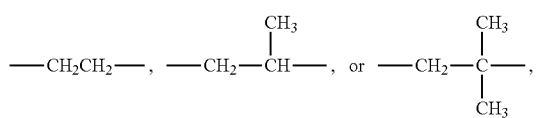

each of x' and y' is an integer equal to or greater than 0, and the average of x'+y' is at least 0 and not more than 10.)

Examples of trivalent and higher alcohols include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane and 1,3,5-trihydroxymethyl benzene. Of these, glycerol, trimethylolpropane and pentaerythritol are desirable examples.

One bivalent alcohol or trivalent or higher alcohol may be used alone, or multiple kinds may be used together.

Specific examples of the polyvalent carboxylic acid are as follows.

Examples of bivalent carboxylic acids include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, and acid anhydrides and lower alkyl esters of these. Of these, maleic acid, fumaric acid, terephthalic acid and n-dodecenylsuccinic acid are desirable examples.

Examples of trivalent and higher carboxylic acids include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylenecarboxypropane, 1,2,4-cyclohexanetricarboxylic acid, tetra(methylenecarboxy)methane, 1,2,7,8-octanetetracarboxylic acid, pyromellitic acid and Empol trimer acid. Acid anhydrides or lower alkyl esters of these may also be used.

Of these, 1,2,4-benzenetricarboxylic acid (trimellitic acid) or its derivative may be used by preference because it is inexpensive and the reactions are easy to control.

One bivalent carboxylic acid or trivalent or higher carboxylic acid may be used alone, or multiple kinds may be used together.

One embodiment of the binder resin is a hybrid resin comprising the amorphous polyester resin linked to another binder resin.

Examples include hybrid resins comprising amorphous polyester resins linked to amorphous vinyl resins. Such a hybrid resin may be manufactured by performing a polymerization reaction with either resin or with both resins in the presence of a polymer comprising monomer components capable of reacting with the amorphous vinyl resin and the amorphous polyester resin, respectively.

Of the monomers constituting amorphous polyester resins, examples of monomers capable of reacting with vinyl resins include unsaturated dicarboxylic acids such as fumaric acid, maleic acid, citraconic acid and itaconic acid, and anhydrides thereof. Of the monomers constituting amorphous vinyl resins, on the other hand, examples of monomers capable of reacting with amorphous polyester resins include those having carboxyl or hydroxyl groups, and acrylic or methacrylic acid esters.

From the standpoint of charging stability, the acid value of the amorphous polyester resin is preferably at least 1 mg KOH/g and not more than 30 mg KOH/g. When it is not more than 30 mg KOH/g, developing efficiency can be easily improved in high-temperature, high-humidity environments in particular because the charging stability of the toner particle is easily improved.

A low-molecular-weight binder resin A and a high-molecular-weight binder resin B may also be mixed and used as the binder resin. The content ratio of the binder resin A and binder resin B (B/A) is preferably at least 10/90 and not more than 60/40 by mass from the standpoint of low-temperature fixability and hot offset resistance.

From the standpoint of low-temperature fixability, the softening point of the binder resin A is preferably at least 70° C. and less than 100° C.

From the standpoint of hot offset resistance, the softening point of the binder resin B is preferably at least 100° C. and not more than 150° C.

Examples of the wax include the following: hydrocarbon waxes such as low-molecular-weight polyethylene, low-molecular-weight polypropylene, alkylene copolymers, microcrystalline wax, paraffin wax and Fischer-Tropsch wax; hydrocarbon wax oxides such as polyethylene oxide wax, and block copolymers of these; waxes consisting primarily of fatty acid esters, such as carnauba wax; and partially or fully deoxidized fatty acid esters, such as deoxidized carnauba wax. Other examples include the following: saturated linear fatty acids such as palmitic acid, stearic acid and montanic acid; unsaturated fatty acids such as brassidic acid, eleostearic acid and parinaric acid; saturated alcohols such as stearyl alcohol, aralkyl alcohol, behenyl alcohol, carnaubyl alcohol, seryl alcohol and melissyl alcohol; polyvalent alcohols such as sorbitol; esters of fatty acids such as palmitic acid, stearic acid, behenic acid and montanic acid with alcohols such as stearyl alcohol, aralkyl alcohol, behenyl alcohol, carnaubyl alcohol, seryl alcohol and mellisyl alcohol; fatty acid amides such as linoleamide, oleamide and lauramide; saturated fatty acid bisamides such as methylene bistearamide, ethylene biscapramide, ethylene bislauramide and hexamethylene bisstearamide; unsaturated fatty acid amides such as ethylene bisoleamide, hexamethylene bisoleamide, N,N'-dioleyladipamide and N,N'-dioleylsebacamide; aromatic bisamides such as m-xylene bisstearamide and N,N'-distearylisophthalamide; aliphatic metal salts such as calcium stearate, calcium laurate, zinc stearate and magnesium stearate (commonly called metal soaps); aliphatic hydrocarbon waxes grafted with vinyl monomers such as styrene or acrylic acid; partial esterified products of fatty acids and polyvalent alcohols, such as behenic acid monoglyceride; and methyl ester compounds with hydroxyl groups obtained by hydrogenation of plant-based oils and fats.

Of these, a hydrocarbon wax such as paraffin wax or Fischer-Tropsch wax or a fatty acid ester wax such as carnauba wax is preferred for improving low-temperature fixability and hot offset resistance. A hydrocarbon wax is especially preferred for further improving hot offset resistance.

The content of the wax is preferably at least 1 mass part and not more than 20 mass parts per 100 mass parts of the binder resin.

In an endothermic curve obtained during temperature rise with a differential scanning calorimeter, the peak temperature (melting point) of the maximum endothermic peak of the wax is preferably at least 45° C. and not more than 140° C. This is desirable because both storability and hot offset resistance of the toner particle can be achieved when the maximum endothermic peak temperature of the wax is within this range.

The toner base particle may also contain a colorant. The following are examples of colorants.

Examples of black colorants include carbon black, and blacks obtained by blending yellow, magenta and cyan colorants.

A pigment may be used alone as the colorant, but from the standpoint of image quality with full-color images, preferably a dye and a pigment are combined to improve the color clarity.

Examples of pigments for magenta toners include the following: C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C.I. Pigment Violet 19; and C.I. Vat Red 1, 2, 10, 13, 15, 23, 29 and 35.

Examples of dyes for magenta toners include the following: C.I. Solvent Red 1, 3, 8, 23, 24, 25, 27, 30, 49, 81, 82, 83, 84, 100, 109 and 121; C.I. Disperse Red 9; C.I. Solvent Violet 8, 13, 14, 21 and 27; oil-soluble dyes such as C.I. Disperse Violet 1; C.I. Basic Red 1, 2, 9, 12, 13, 14, 15, 17, 18, 22, 23, 24, 27, 29, 32, 34, 35, 36, 37, 38, 39 and 40; and basic dyes such as C.I. Basic Violet 1, 3, 7, 10, 14, 15, 21, 25, 26, 27 and 28.

Examples of pigments for cyan toners include the following: C.I. Pigment Blue 2, 3, 15:2, 15:3, 15:4, 16 and 17; C.I. Vat Blue 6; C.I. Acid Blue 45; and copper phthalocyanine pigments having 1 to 5 phthalimidomethyl groups substituted on a phthalocyanine skeleton.

Examples of dyes for cyan toners include C.I. Solvent Blue 70.

Examples of pigments for yellow toners include the following: C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C.I. Vat Yellow 1, 3 and 20.

Examples of dyes for yellow toners include C.I. Solvent Yellow 162.

The content of the colorant is preferably at least 0.1 mass parts and not more than 30 mass parts per 100 mass parts of the binder resin.

The toner base particle may also contain a charge control agent as necessary. A known charge control agent may be used, but a metal compound of an aromatic carboxylic acid is especially desirable because it is colorless, provides a rapid charging speed of the toner particle, and can stably maintain a fixed charge quantity.

Examples of negative charge type charge control agents include salicylic acid metal compounds, naphthoic acid metal compounds, dicarboxylic acid metal compounds, polymeric compounds having sulfonic acids or carboxylic acids in the side chains, polymeric compounds having sulfonic acid salts or sulfonic acid esters in the side chains, polymeric compounds having carboxylic acid salts or carboxylic acid esters in the side chains, and boron compounds, urea compounds, silicon compounds and calixarenes.

Examples of positive charge type charge control agents include quaternary ammonium salts, polymeric compounds having such quaternary ammonium salts in the side chains, and guanidine compounds and imidazole compounds.

The charge control agent may be added either internally or externally to the toner base particle.

The content of the charge control agent is preferably at least 0.2 mass parts and not more than 10 mass parts per 100 mass parts of the binder resin.

The toner may also contain an inorganic fine particle as necessary.

The inorganic fine particle may be added internally to the toner base particle, or mixed with the toner particle as an external additive to form the toner. An inorganic fine particle such as a silica fine particle, titanium oxide fine particle or aluminum oxide fine particle may be used as an external additive. The inorganic fine particle is preferably a particle that has been hydrophobized with a hydrophobizing agent such as a silane compound, silicone oil or a mixture of these.

As an external additive for improving flowability, an inorganic fine particle with a specific surface area of at least 50 $m^2/g$ and not more than 400 $m^2/g$ is preferred. And, as an external additive for improving stable durability, an inorganic fine particle with a specific surface area of at least 10 $m^2/g$ and not more than 50 $m^2/g$ is preferred.

The inorganic fine particle with a specific surface area within each the range may also be combined in order to achieve both improved flowability and stable durability.

The content of this external additive is preferably at least 0.1 mass parts and not more than 10.0 mass parts per 100 mass parts of the toner particle. Mixing of the toner particle with the external additive may be accomplished with a known apparatus such as a Henschel mixer.

The toner may be used as a one-component developer, but is preferably mixed with a magnetic carrier and used as a two-component developer in order to further improve dot reproducibility. A two-component developer is also desirable for obtaining stable images over a long period of time.

A commonly known magnetic carrier may be used, such as a surface-oxidized iron powder or unoxidized iron powder; a metal particle such as an iron, lithium, calcium, magnesium, nickel, copper, zinc, cobalt, manganese, chromium or rare earth, an alloy particle of thereof, or oxide particles of these; a magnetic body such as ferrite; or a magnetic body or a magnetic body-dispersed resin carrier (so-called resin carrier) containing a binder resin that holds the magnetic body in a dispersed state.

When the toner is mixed with a magnetic carrier and used as a two-component developer, the content of the toner in the two-component developer is preferably at least 2 mass % and not more than 15 mass %, or more preferably at least 4 mass % and not more than 13 mass %.

The method for manufacturing the toner base particle is not particularly limited as long as it is a conventional known manufacturing method, such as an emulsion aggregation method, melt kneading method or dissolution suspension method, but the melt kneading method is preferred from the standpoint of dispersibility of the starting materials.

That is, the toner base particle is preferably one that has been obtained by melt kneading a toner composition containing a binder resin and a wax, and then pulverizing the resulted kneaded material.

Wax dispersibility is improved when the toner base particle is manufactured via a melt kneading step.

It is though that with a toner base particle manufactured by a manufacturing method that includes a melt kneading step, because the starting materials of the toner base particle are thoroughly mixed by heat and shearing force during melt kneading, the dispersibility of the wax is improved in the resulting toner base particle.

As a result, the wax is finely dispersed in the toner base particle, improving hot offset resistance. Exudation of the wax onto the toner surface in mechanical stress environments and high-temperature, high-humidity environments is thereby suppressed, resulting in excellent durability.

The melt kneading method is explained below using specific examples, but is not limited to these examples.

First, in the starting material mixing step, a binder resin and a wax together with a colorant and other components as necessary are weighed in specific amounts, compounded and mixed.

The mixing apparatus may be a double cone mixer, V-type mixer, drum mixer, super mixer, Henschel mixer, Nauta mixer, Mechano Hybrid (Nippon Coke & Engineering Co., Ltd.) or the like.

Next, the mixed materials are melt kneaded to disperse the other starting materials in the binder resin. A batch kneading apparatus such as a pressure kneader or Banbury mixer or a continuous kneading apparatus may be used in the melt kneading step, but generally a single- or twin-screw extruder is used because it is advantageous for continuous production. Examples include a KTK twin-screw extruder (Kobe Steel, Ltd.), TEM twin-screw extruder (Toshiba Machine Co., Ltd.), PCM kneader (Ikegai Ironworks Corp), twin-screw extruder (KCK), Ko-kneader (Buss AG) and Kneadex (Nippon Coke & Engineering Co., Ltd.).

The kneaded material obtained by melt kneading can then be rolled with two rolls or the like, and cooled with water or the like in a cooling step.

The resulting kneaded material is then pulverized to the desired particle size. In this pulverization step, the material can first be coarsely pulverized with a crushing apparatus such as a crusher, hammer mill or feather mill, and then pulverized with a pulverizing apparatus such as a Kryptron system (Kawasaki Heavy Industries, Ltd.), Super Rotor (Nisshin Engineering Inc.) or Turbo Mill (Turbo Kogyo Co., Ltd.) or an air jet system pulverizing apparatus.

This is then classified as necessary with a sieving or classifying apparatus such as an Elbow Jet (Nittetsu Mining Co., Ltd.) using inertial classification, a Turboplex (Hosokawa Micron Corporation) using centrifugal classification, a TSP Separator (Hosokawa Micron Corporation) or a Faculty (Hosokawa Micron Corporation) to obtain a toner base particle.

A coating layer containing a 1,2-polybutadiene resin is then formed by the methods described above at the surface of the toner base particle to obtain a toner particle.

The emulsion aggregation method is explained here as another manufacturing method.

The emulsion aggregation method involves first preparing an aqueous dispersion of fine particles consisting of the constituent materials of the toner base particle with a particle size sufficiently smaller than the target particle size, and then aggregating these fine particles in an aqueous medium until the desired particle size is reached and heating to fuse the resin and manufacture a toner base particle.

That is, in the emulsion aggregation method a toner particle comprising a coating layer containing a 1,2-polybutadiene resin at the surface of a toner base particle is manufactured by going through a dispersion step in which a dispersion of fine particles consisting of the constituent materials of the toner base particle is prepared, an aggregation step in which the fine particles consisting of the constituent materials of the toner base particle are aggregated and the particle size is controlled until the desired particle size is reached, a shell attachment step in which 1,2-polybutadiene resin fine particles for forming a shell phase are added to the resulting dispersion of aggregate particles to thereby attach the 1,2-polybutadiene resin fine particles to the surface of the aggregate particles, a fusion step in which the aggregate particles with the 1,2-polybutadiene resin fine particles attached to the surface thereof are fused, and a cooling step.

Aqueous dispersions of fine particles of the binder resin and 1,2-polybutadiene resin (sometimes collectively called resin fine particles below) can be prepared by known methods. Examples include phase inversion emulsification, in which the resin is emulsified by adding an aqueous medium to a solution of the resin dissolved in an organic solvent, and forced emulsification, in which the resin is forcibly emulsified by high-temperature heat treatment in an aqueous medium without the use of an organic solvent.

Specifically, the binder resin and the 1,2-polybutadiene resin are dissolved in an organic solvent that dissolves these resins, and a surfactant or basic compound is then added. Next, stirring is performed with a homogenizer or the like as an aqueous medium is gradually added to precipitate resin fine particles. The organic solvent is then removed by heating or depressurization to prepare an aqueous dispersion of the resin fine particles. The organic solvent used to dissolve the resin may be any capable of dissolving the resin, but tetrahydrofuran, ethyl acetate, chloroform or the like is preferred for reasons of solubility.

The surfactant used during emulsification is not particularly limited, but examples include anionic surfactants such as sulfate ester salts, sulfonate salts, carboxylate salts, phosphate esters and soaps; cationic surfactants such as amine salts and quaternary ammonium salts; and non-ionic surfactants such as polyethylene glycols, alkyl phenol ethylene oxide adducts and polyvalent alcohols. One kind of surfactant may be used alone, or two or more kinds may be combined.

Examples of the basic compound used during emulsification include inorganic salts such as sodium hydroxide and potassium hydroxide; ammonia; and organic salts such as triethylamine, trimethylamine, dimethylamino ethanol and diethylamino ethanol. One kind of basic compound may be used alone, or two or more kinds may be combined.

The 50% particle diameter (d50) of the resin fine particles based on volume distribution is preferably 0.05 to 1.0 µm, or more preferably 0.05 to 0.4 µm. A dynamic light scattering particle size distribution meter (Nanotrac UPA-EX150, Nikkiso Co., Ltd.) may be used to measure the 50% particle diameter (d50) based on volume distribution.

Meanwhile, an aqueous dispersion of the wax fine particles can be prepared by adding the wax to an aqueous medium containing a surfactant, heating to at or above the melting point of the wax and dispersing the wax in particle form with a homogenizer (for example, a "Clearmix W-Motion" by M Technique Co. Ltd.) having strong shearing ability or a pressure discharge-type disperser for example, a "Gaulin Homogenizer" by Gaulin Corp.), and then cooling to below the melting point.

The dispersed particle size of the wax fine particles in the aqueous dispersion is preferably a 50% particle diameter (d50) of 0.03 to 1.0 µm, or more preferably 0.1 to 0.5 µm based on volume distribution.

In the aggregation step, the aqueous dispersion of the binder resin fine particles is mixed with the aqueous dispersion of the wax fine particles to prepare a mixture. The fine particles contained in the prepared mixture are then aggregated to form aggregate particles of the desired particle size. Aggregate particles formed by aggregation of the binder resin fine particles and wax fine particles are formed in this step by adding and mixing a flocculant and applying heat and/or mechanical force as necessary.

Examples of the flocculant include metal salts of univalent metals such as sodium and potassium; metal salts of bivalent metals such as calcium and magnesium; and metal salts of trivalent metals such as iron and aluminum.

The flocculant is preferably added and mixed at a temperature at or below the glass transition temperature of the resin particles contained in the mixture. Aggregation proceeds stably when mixing is performed under these temperature conditions.

Mixing of the flocculant with the mixture may be performed with a known mixing apparatus, homogenizer, mixer or the like.

The 50% particle size (d50) based on volume distribution of the aggregate particles formed in the aggregation step is not particularly limited, but is normally controlled to at least 4.0 µm and not more than 7.0 µm, or roughly the same as the 50% particle size (d50) based on volume distribution of the toner base particle to be obtained. This can be easily controlled by appropriately setting the temperature and the stirring and mixing conditions during addition and mixing of the flocculant. The particle size distribution of the toner base particles can be measured with a particle size distribution analyzer using the Coulter method (Coulter counter Multisizer 3 (registered trademark), Beckman Coulter, Inc.).

1,2-polybutadiene resin fine particles for forming the shell phase are then added to the dispersion of aggregate particles obtained in the aggregation step to thereby attach the 1,2-polybutadiene fine particles to the surface of the aggregate particles.

In the fusion step, the aggregate particles with the 1,2-polybutadiene fine particles attached to the surfaces thereof are heated and fused at a temperature at or above the glass transition temperature of the resin, to thereby smooth the surfaces of the aggregate particles and manufacture resin particles with a core-shell structure.

A chelating agent, pH adjuster, surfactant or the like may be added appropriately to prevent the aggregate particles from fusion before the fusion step.

Examples of chelating agents include ethylenediamine tetraacetic acid (EDTA) and its Na salt and other alkali metal salts, sodium gluconate, sodium tartrate, potassium citrate and sodium citrate, nitrotriacetate (NTA) salts, and many water-soluble polymers (polymer electrolytes) containing both COOH and OH functional groups.

The heating temperature may be any temperature between the glass transition temperature of the resin contained in the aggregate particles and the temperature at which the resin is thermally decomposed. The heating and fusion time may be short if the heating temperature is high, but must be long if the heating temperature is low. That is, the heating and fusion time cannot be specified unconditionally because it depends on the heating temperature, but is normally 10 minutes to 10 hours.

In the cooling step, the temperature of the aqueous medium containing the resin particles is cooled to a temperature lower than the glass transition temperature of the binder resin. The cooling speed is about at least 0.1° C./min and not more than 50° C./min.

The resin particles obtained by going through these steps are washed with ion-exchange water, filtered multiple times, and dried to obtain a toner particle.

After the 1,2-polybutadiene resin or the like has been added to the toner base particle surfaces to form a coating layer, preferably heat treatment is performed to fix this coating layer to the toner base particle surfaces. This heat treatment is preferably treatment with hot air in order to prevent coalescence of toner particles and achieve uniformity of shape.

The method of heat-treating the toner particles is illustrated here by a specific example using the heat treatment apparatus shown in FIG. 1.

Toner particles are quantitatively supplied by a quantitative material supply means 1, and are then conducted by compressed gas regulated by a compressed gas flow regulation means 2 to an introduction pipe 3 disposed on the vertical line of the material supply means. After passing through the introduction pipe 3, the toner particles are uniformly dispersed by a conical projecting member 4 disposed in the center of the material supply means, and are conducted through supply pipes 5 spreading radially in eight directions to a treatment chamber 6 where they are heat treated.

At this time, the flow of the toner particles supplied to the treatment chamber 6 is regulated by a regulation means 9 for regulating the flow of the toner particles inside the treatment chamber 6. Thus, the toner particles supplied to the treatment chamber 6 are heat treated and then cooled while circulating within the treatment chamber 6.

The hot air for heat-treating the supplied toner particles is supplied from a hot air supply means 7, distributed by a distribution member 12, and circulated spirally and introduced within the treatment chamber 6 by a circulation member 13 for circulating the hot air. The circulation member 13 for circulating the hot air may be configured with multiple blades, and the circulation of the hot air may be controlled by means of the number and angle of the blades (11 shows the hot air supply means outlet). The temperature of the hot air supplied within the treatment chamber 6 is preferably at least 100° C. and not more than 300° C., or more preferably at least 130° C. and not more than 170° C. at the outlet of the hot air supply means 7. When the temperature at the outlet of the hot air supply means 7 is within this range, it is possible to uniformly treat the toner particles while preventing fusion and coalescence of toner particles due to excessive heating of the toner particles.

Hot air is supplied from the hot air supply means 7. After heat treatment, the heat-treated toner particles are further cooled by means of cool air supplied from a cool air supply means 8. The temperature of the cool air supplied from the cool air supply means 8 is preferably at least −20° C. and not more than 30° C. When the temperature of the cool air is within this range, the heat-treated toner particles can be cooled efficiently, and fusion and coalescence of the heat-treated toner particles can be prevented without inhibiting uniform heat treatment of the toner particles. The absolute moisture content of the cool air is preferably at least 0.5 g/m$^3$ and not more than 15.0 g/m$^3$.

Next, the cooled heat-treated toner particles are collected by a collection means 10 at the bottom of the treatment chamber 6. A blower (not shown) is provided at the end of the collection means 10 to transport the particles by suction.

Powder particle supply ports 14 are provided in such a way that the circulation direction of the supplied toner particles is the same as the circulation direction of the hot air, and the collection means 10 is also provided in a tangential direction to the outer periphery of the treatment chamber 6 so as to maintain the circulating direction of the circulated toner particles. Moreover, the system is configured so that the cool air supplied from the cool air supply means 8 is supplied horizontally and from a tangential direction from the outer periphery of the device to the inner periphery of the treatment chamber. The circulating direction of the toner particles before heat treatment supplied from the powder particle supply ports 14, the circulating direction of the cool air supplied from the cool air supply means 8 and the circulating direction of the hot air supplied from the hot air supply means 7 are all the same direction. This means that no turbulence occurs within the treatment chamber 6, the circulating flow in the unit is reinforced, and the toner particles before heat treatment are subjected to strong centrifugal force, further improving the dispersibility of the toner particles before heat treatment and resulting in heat-treated toner particles with a uniform shape and few coalesced particles. An appropriately selected additive such as an inorganic fine particle may then be added as necessary to obtain a toner.

The average circularity of the toner is preferably at least 0.960 and not more than 1.000, or more preferably at least 0.965 and not more than 1.000. The transfer efficiency of the toner is improved when the average circularity is within the range.

The average circularity of the toner can be measured under the measurement and analysis conditions for calibration operations, using an "FPIA-3000" flow-type particle image analyzer (Sysmex Corporation).

The methods for measuring the various physical properties in the present invention are explained next.

Measuring Glass Transition Temperature (Tg) of Resin

The glass transition temperature of the resin is measured in accordance with ASTM D3418-82, using a "Q2000" differential scanning calorimeter (TA Instruments).

The melting points of indium and zinc are used for temperature correction of the device detection part, and the heat of fusion of indium is used for correction of the calorific value.

Specifically, about 5 mg of the resin is weighed precisely into an aluminum pan, and an empty aluminum pan is used for reference.

Measurement is performed within a temperature range of 30° C. to 180° C. at a ramp rate of 10° C./min. Once the temperature has risen to 180° C. it is maintained for 10 minutes, lowered to 30° C., and then raised again. A change in specific heat is obtained within the temperature range of 30° C. to 100° C. during this second temperature rise. The temperature at the point of intersection between the differential thermal curve and a line midway between the baselines prior to and subsequent to the appearance of the change in specific heat is taken as the glass transition temperature (Tg) of the resin.

Measuring Maximum Endothermic Peak Temperatures (Melting Points) of Wax and 1,2-Polybutadiene Resin The peak temperatures (melting points) of the maximum endothermic peaks of the wax and the 1,2-polybutadiene resin are measured under the following conditions using a "Q2000" differential scanning calorimeter (TA Instruments).

Ramp rate: 10° C./min
Measurement start temperature: 20° C.
Measurement end temperature: 180° C.

The melting points of indium and zinc are used for temperature correction of the device detection part, and the heat of fusion of indium is used for correction of the calorific value.

Specifically, about 5 mg of sample is measured precisely, placed in an aluminum pan, and measured once. An empty aluminum pan is used for reference.

When there are multiple peaks, the maximum endothermic peak in the present invention is the peak at which the endothermic quantity is greatest, and the peak temperature of this maximum endothermic peak is taken as the melting point.

Measuring Weight-Average Molecular Weight (Mw)

The weight-average molecular weight is measured as follows by gel permeation chromatography (GPC).

First, the sample is dissolved in tetrahydrofuran (THF) at room temperature over the course of 24 hours. The resulting solution is then filtered with a solvent-resistant membrane filter with a pore diameter of 0.2 μm (Sample Pretreatment Cartridge, Tosoh Corporation) to obtain a sample solution. The concentration of THF-soluble components in the sample solution is adjusted to about 0.8 mass %. Measurement is performed under the following conditions using this sample solution.

System: HLC8120 GPC (detector: RI) (Tosoh Corporation)
Columns: Shodex KF-801, 802, 803, 804, 805, 806, 807 (total 7) (Showa Denko K.K.)
Eluent: Tetrahydrofuran (THF)
Flow rate: 1.0 mL/min
Oven temperature: 40.0° C.
Sample injection volume: 0.10 mL A molecular weight calibration curve prepared using standard polystyrene resin (trade name "TSK standard polystyrene F-850, F-450, F-288, F-128, F-80, F-40, F-20, F-10, F-4, F-2, F-1, A-5000, A-2500, A-1000, A-500", Tosoh Corporation) is used for calculating the molecular weights of the samples.

Method for Measuring Weight-Average Particle Diameter (D4) of Toner, Etc.

The weight-average particle diameter (D4) of the toner or toner particle (hereunder sometimes called the toner, etc.) is measured with 25,000 effective measurement channels using a "Coulter Counter Multisizer 3" registered trademark, Beckman Coulter, Inc.) precision particle size distribution measurement device using the pore electrical resistance method and equipped with a 100 μm aperture tube, using the "Beckman Coulter Multisizer 3 Version 3.51" dedicated software Beckman Coulter, Inc.) attached to the device for setting the measurement conditions and analyzing the measurement data, and the measurement data are analyzed and used to calculate the particle diameter.

A solution of special-grade sodium chloride dissolved to a concentration of about 1 mass % in ion-exchange water, such as "Isoton II" Beckman Coulter, Inc.), may be used as the electrolytic solution for measurement.

The following settings are performed on the dedicated software prior to measurement and analysis.

On the "Change Standard Operating Method SOM" screen of the dedicated software, the total count in control mode is set to 50,000 particles, the number of measurements to one, and the Kd value to a value obtained using "Standard Particles 10.0 μm" Beckman Coulter, Inc.). The threshold and noise level are set automatically by pressing the threshold/noise level measurement button. The current is set to 1,600 μA, the gain to 2 and the electrolytic solution to Isoton II, and a check is entered for aperture tube flush after measurement.

On the "Conversion Setting from Pulse to Particle Diameter" screen of the dedicated software, the bin interval is set to the logarithmic particle diameter, the particle diameter bin is set to the 256 particle diameter bin, and the particle diameter range is set to at least 2 μm and not more than 60 μm.

The specific measurement methods are as follows.

(1) About 200 mL of the aqueous electrolytic solution is placed in a 250 mL glass round-bottomed beaker dedicated to the Multisizer 3, set on a sample stand, and stirred with a stirrer rod counterclockwise at a rate of 24 rotations/sec. Contamination and bubbles in the aperture tube are removed by means of the "Aperture Flush" function of the dedicated software.

(2) About 30 mL of the aqueous electrolytic solution is placed in a 100 mL glass flat-bottom beaker, and about 0.3 mL of a diluted solution of "Contaminon N" (a 10 mass % aqueous solution of a pH 7 neutral detergent for washing precision measurement equipment, comprising a nonionic surfactant, an anionic surfactant and an organic builder, made by Wako Pure Chemical Industries, Ltd.) diluted 3 times by mass with ion exchange water is added thereto as a dispersant.

(3) A predetermined amount of ion-exchange water is placed in a water bath of an ultrasonic disperser "Ultrasonic Dispersion System Tetora 150" Nikkaki Bios Co., Ltd.) with an electric output of 120 W, in which two oscillators with an oscillation frequency of 50 kHz are built-in with the phases of the oscillators shifted by 180° to one other, and about 2 mL of the Contaminon N is added to the water bath.

(4) The beaker of (2) is set in a beaker-fixing hole of the ultrasonic disperser, and the ultrasonic disperser is operated. The height position of the beaker is adjusted so as to maximize the resonance state of the surface of the electrolytic solution in the beaker.

(5) With the electrolytic solution in the beaker of (4) exposed to ultrasound waves, about 10 mg of the toner or the like is added little by little to the electrolytic solution, and dispersed. Ultrasonic dispersion treatment is continued for a further 60 seconds. During the ultrasonic dispersion, the temperature of the water in the water bath is adjusted as necessary so as to be at least 10° C. and not more than 40° C.

(6) Using a pipette, the electrolytic solution of (5) with the dispersed toner and the like is added dropwise to the round-bottom beaker of (1) disposed on the sample stand, and the measurement concentration is adjusted to about 5%. Measurement is then performed until the number of measured particles reaches 50,000.

(7) The measurement data is analyzed with the dedicated software attached to the apparatus, and the weight-average particle diameter (D4) is calculated. The weight-average particle diameter (D4) is the "Average Diameter" on the analysis/volume statistical value (arithmetic average) screen when graph/vol % is set by the dedicated software.

Structure of Resin (NMR)

The structure of the resin (1,2-polybutadiene resin, amorphous polyester, etc.) contained in the toner is analyzed by nuclear magnetic resonance spectroscopy ($^{1}$H-NMR).

Measurement unit: JNM-EX400 (JEOL Ltd.)
Measurement frequency: 400 MHz
Pulse condition: 5.0 μs
Frequency range: 10,500 Hz
Cumulative number: 1,024
Measurement solvent: DMSO-d6

The sample was dissolved as much as possible in DMSO-d6, and measurement was performed under the above conditions. The structure and the like of the sample were determined from the chemical shift values and proton ratios of the resulting spectrum.

Method for Confirming Coating Layer Using Transmission Electron Microscope

The presence of a coating layer at the surface of the toner base particle was confirmed with a transmission electron microscope (TEM).

The toner was stained with ruthenium tetroxide to obtain a clear contrast of the 1,2-polybutadiene resin. The 1,2-polybutadiene resin is stained more strongly than the binder resin, which has carbonyl groups. It is thought that penetration of the stain material into the 1,2-polybutadiene resin is stronger than in the organic component inside the toner base particle due to interactions between the ruthenium tetroxide and the polyolefin part of the 1,2-polybutadiene resin.

Because the amount of ruthenium atoms differs depending on the strength of the stain, more such atoms are present in the strongly stained part, which therefore appears black in the observational image because the electron beam does not pass through it, while the more weakly stained part appears white because the electron beam passes through it easily. It is thus possible, for example, to distinguish 1,2-polybutadiene resin from the amorphous polyester, and thus to verify the presence of the coating layer at the surface of the toner base particle.

The specific procedures are as follows.

An Os film (5 nm) and a naphthalene film (20 nm) were formed as protective films with an Osmium Plasma Coater (OPC80T, Filgen, Inc.), and embedded in D800 photocurable resin (JEOL Ltd.). A toner particle cross-section 60 nm in thickness was then prepared at a cutting rate of 1 mm/sec with an ultrasonic Ultramicrotome (UC7, Leica Microsystems).

The resulting cross-section was stained for 15 minutes in a $RuO_4$ gas, 500 Pa atmosphere with a vacuum electronic staining unit (VSC4R1H, Filgen, Inc.), and subjected to STEM observation with a TEM (JEM2800, JEOL Ltd.).

Images were obtained with a STEM probe size of 1 nm and an image size of 1024×1024 pixels. The resulting images were binarized (threshold 120/255 gradation) with image processing software (Image-Pro Plus, Media Cybernetics, Inc.).

In addition, the coverage ratio of the toner base particle by the coating layer was calculated according to the following formula for 100 toner particles in the cross-sectional toner particle images obtained by STEM observation, and the average was calculated.

Coating layer coverage ratio (%)=(length of interface between toner base particle and coating layer having thickness of at least 0.1 μm)/(length of circumference of toner base particle)×100

The thickness of the coating layer was also measured from the cross-sectional toner particle images obtained by STEM observation. This thickness is the thickness of the coating layer from the surface of the toner base particle to the surface of the toner particle. The thickness of the coating layer was measured at any 10 points on each toner particle cross-section for 100 toner particles, and the average was given as the average thickness of the coating layer.

It is thus possible to confirm, based on cross-sectional toner images obtained by TEM, the presence of a coating layer at the surface of the toner base particle.

A crystalline polyester stains more weakly than the 1,2-polybutadiene resin because it has no polyolefin component. Consequently, when a crystalline polyester is contained in the toner, the crystalline polyester can be distinguished from the 1,2-polybutadiene resin based on differences in contrast.

Method for Measuring Softening Point (Tm)

The softening point of the resin and the like is measured using a constant load extrusion type capillary rheometer (Flow Tester CFT-500D flow characteristics evaluation device, Shimadzu Corporation) in accordance with the attached manual.

With this device, the temperature of a measurement sample packed in a cylinder is raised to melt the sample while a fixed load is applied with a piston from the top of the measurement sample, the melted measurement sample is extruded from a die at the bottom of the cylinder, and a flow curve can then be obtained showing the relationship between temperature and the amount of descent of the piston during this process.

In the present invention, the softening point is the "Melting Temperature by the ½ Method" as described in the manual attached to the "Flow Tester CFT-500D flow characteristics evaluation device".

The melting temperature by the ½ method was calculated as follows.

First, ½ of the difference between the descent of the piston upon completion of outflow (Smax) and the descent of the piston at the beginning of outflow (Smin) is calculated and given as X X=Smax−Smin)/2). The temperature in the flow curve at which the descent of the piston is the sum of X and Smin is given as the melting point by the ½ method.

For the measurement sample, about 1.0 g of resin is compression molded for about 60 seconds at about 10 MPa in a 25° C. environment with a tablet molding compressor (for example, NT-100H, NPa System Co., Ltd.) to obtain a cylinder about 8 mm in diameter.

The CFT-500D measurement conditions are as follows.
Test mode: Heating method
Initial temperature: 50° C.
Achieved temperature: 200° C.
Measurement interval: 1.0° C.
Ramp rate: 4.0° C./min
Piston cross-sectional area: 1.000 cm$^2$
Test load (piston load): 10.0 kgf (0.9807 MPa)
Preheating time: 300 seconds
Die hole diameter: 1.0 mm
Die length: 1.0 mm

EXAMPLES

The present invention is explained in further detail below using examples. The present invention is not limited by these examples. Unless otherwise specified, parts and percentage values in the examples below are based on mass.

Manufacturing Example of Binder Resin A

Polyoxypropylene(2.2)-2,2-bis(4-hydroxyphenyl)propane: 71.9 parts (0.20 mol; 100.0 mol % of total moles of polyvalent alcohol)

Terephthalic acid: 26.8 parts (0.16 mol; 96.0 mol % of total moles of polyvalent carboxylic acid)

Titanium tetrabutoxide: 0.5 parts

These materials were weighed into a reaction vessel equipped with a cooling pipe, a stirrer, a nitrogen introduction pipe and a thermocouple.

The reaction vessel was then purged with nitrogen gas, the temperature was gradually raised with stirring, and the mixture was reacted for 4 hours with stirring at 200° C.

The pressure inside the reaction vessel was lowered to 8.3 kPa, maintained for 1 hour, and then returned to atmospheric pressure (first reaction step).

Trimellitic anhydride: 1.3 parts (0.01 mol; 4.0 mol % of total moles of polyvalent carboxylic acid)

This material was then added, the pressure inside the reaction vessel was lowered to 8.3 kPa, and the mixture was reacted for 1 hour with the temperature maintained at 180° C. (second reaction step) to obtain a binder resin A with a softening point (Tm) of 94° C. and a glass transition temperature (Tg) of 57° C. (amorphous polyester resin A).

Manufacturing Example of Binder Resin B

Polyoxypropylene(2.2)-2,2-bis(4-hydroxyphenyl)propane: 71.8 parts (0.20 mol; 100.0 mol % of total moles of polyvalent alcohol)

Terephthalic acid: 15.0 parts (0.09 mol; 55.0 mol % of total moles of polyvalent carboxylic acid)

Adipic acid: 6.0 parts (0.04 mol; 25.0 mol % of total moles of polyvalent carboxylic acid)

Titanium tetrabutoxide: 0.5 parts

These materials were weighed into a reaction vessel equipped with a cooling pipe, a stirrer, a nitrogen introduction pipe and a thermocouple.

The reaction vessel was then purged with nitrogen gas, the temperature was gradually raised with stirring, and the mixture was reacted for 2 hours with stirring at 200° C.

The pressure inside the reaction vessel was lowered to 8.3 kPa, maintained for 1 hour, and then returned to atmospheric pressure (first reaction step).

Trimellitic anhydride: 6.4 parts (0.03 mol; 20.0 mol % of total moles of polyvalent carboxylic acid)

This material was then added, the pressure inside the reaction vessel was lowered to 8.3 kPa, and the mixture was reacted for 15 hour with the temperature maintained at 160° C. (second reaction step) to obtain a binder resin B with a softening point (Tm) of 132° C. and a glass transition temperature (Tg) of 61° C. (amorphous polyester resin B).

Manufacturing Example of Binder Resin C 50 parts of xylene were loaded into an autoclave, nitrogen was substituted, and the temperature was raised to 185° C. with stirring in a sealed state.

A mixed solution of 95 parts of styrene, 5 parts of n-butyl acrylate, 5 parts of di-t-butyl peroxide and 20 parts of xylene was added dropwise continuously for 3 hours and polymerized with the internal temperature of the autoclave controlled at 185° C.

Manufacturing Example of 1,2-Polybutadiene Resins D3 to D9

1,2-polybutadiene resins D3 to D9 were obtained by the same operations as in the manufacturing example of the 1,2-polybutadiene resin D2 except that the added amount of 1,3-butadiene was changed, and the 2-pentyl-1,3-butadiene was replaced with 1,3-pentadiene or 2-methyl-1,3-butadiene in the amounts shown in Table 1.

TABLE 1

| 1,2-poly butadiene resin | 1,3-butadiene (parts) | 2-pentyl-1,3-butadiene (parts) | 1,3-pentadiene (parts) | 2-methyl-1,3-butadiene (parts) | Content ratio (mass %) of monomer unit represented by Formula (1) | Content ratio (mass %) of syndiotactic structures | Dielectric loss tangent | Melting point (° C.) |
|---|---|---|---|---|---|---|---|---|
| D1 | 100 | 0 | 0 | 0 | 100 | 50 | 4.5 | 90 |
| D2 | 98 | 2 | 0 | 0 | 98 | 50 | 4.5 | 70 |
| D3 | 98 | 0 | 2 | 0 | 98 | 50 | 3.5 | 110 |
| D4 | 96 | 0 | 4 | 0 | 96 | 50 | 3.0 | 120 |
| D5 | 94 | 0 | 6 | 0 | 94 | 50 | 4.0 | 50 |
| D6 | 94 | 0 | 0 | 6 | 94 | 50 | 2.0 | 50 |
| D7 | 90 | 0 | 10 | 0 | 90 | 50 | 5.0 | 50 |
| D8 | 70 | 0 | 30 | 0 | 70 | 50 | 1.0 | 50 |
| D9 | 50 | 0 | 50 | 0 | 50 | 30 | 8.0 | 50 |

This was maintained at the same temperature for 1 hour to complete polymerization, and the solvent was removed to obtain a styrene-acrylic acid ester resin C.

The resulting binder resin C (styrene-acrylic acid ester resin C) had a weight-average molecular weight (Mw) of 3,500, a softening point (Tm) of 96° C. and a glass transition temperature (Tg) of 58° C.

Manufacturing Example of 1,2-Polybutadiene Resin D1

A 2 L two-necked eggplant flask was purged with nitrogen at room temperature, 600 parts of a mixed cyclohexane/n-heptane solvent (mass ratio: 80/20), 100 parts of 1,3-butadiene, 2 parts of a toluene solution of methyl aluminoxane, and 2 parts of a toluene solution of cobalt bis[tris(4-methylphenylphosphine)]dichloride were added, and polymerization was performed for 1 hour at 40° C. with stirring. The molar ratio of Co atoms/1,3-butadiene was 1/63,000, and the atomic ratio of Al/Co was 38/1.

The reaction was stopped by adding 20 parts of ethanol to the 2 L two-necked eggplant flask. 2,6-di-t-butyl-p-cresol was then added in the amount of 0.3 parts per 100 parts of the resulting polymer, the mixture was heated on a hot plate, and the solvent was removed by heating on a hot plate to obtain a 1,2-polybutadiene resin D1.

Manufacturing Example of 1,2-Polybutadiene Resin D2

A 2 L two-necked eggplant flask was purged with nitrogen at room temperature, 600 parts of a mixed cyclohexane/n-heptane solvent (mass ratio: 80/20), 98 parts of 1,3-butadiene, 2 parts of 2-pentyl-1,3-butadiene, 2 parts of a toluene solution of methyl aluminoxane and 2 parts of a toluene solution of cobalt bis[tris(4-methylphenylphosphine)]dichloride were added, and polymerization was performed for 1 hour at 40° C. with stirring. The molar ratio of Co atoms/1,3-butadiene was 1/63,000, and the atomic ratio of Al/Co was 38/1.

The reaction was stopped by adding 20 parts of ethanol to the 2 L two-necked eggplant flask. 2,6-di-t-butyl-p-cresol was then added in the amount of 0.3 parts per 100 parts of the resulting polymer, and the solvent was removed by heating on a hot plate to obtain a 1,2-polybutadiene resin D2.

Manufacturing Example of Toner 1: Melt Kneading Method Including Heat-Treatment Step

| | |
|---|---|
| Binder resin A | 75.0 parts |
| Binder resin B | 25.0 parts |
| Fischer-Tropsch wax (maximum endothermic peak temperature (melting point): 90° C.) | 5.0 parts |
| C.I. Pigment Blue 15:3 | 5.0 parts |

These materials were mixed at a rotational speed of 20 $s^{-1}$ for a rotation time of 5 minutes with a Henschel mixer (FM-75, Nippon Coke & Engineering Co., Ltd.), and then kneaded with a twin-screw kneader (PCM-30, Ikegai Ironworks Corp) set to 150° C.

The kneaded product was cooled, and crushed to 1 mm or less with a hammer mill to obtain a crushed product.

The resulting crushed product was pulverized with a mechanical pulverizer (T-250, Turbo Kogyo Co., Ltd.). This was then classified with a Faculty F-300 (Hosokawa Micron Corporation) to obtain a toner base particle 1. The operating conditions were classifying rotor speed 130 $s^{-1}$, dispersion rotor speed 120 $s^{-1}$.

5.0 parts of the 1,2-polybutadiene resin D1 were added to 100 parts of the resulting toner base particle 1, and mixed at a rotational speed of 30 $s^{-1}$ for a rotation time of 10 minutes with a Henschel mixer (FM-75, Nippon Coke & Engineering Co., Ltd.).

The resulting toner particle was heat treated with the heat treatment apparatus shown in FIG. 1 to obtain a heat-treated toner particle 1. The operating conditions of the heat treatment apparatus were as follows:

feed: 5 kg/hr, hot air temperature: 150° C., hot air flow: 6 $m^3$/min, cool air temperature: 5° C., cool air flow: 4 $m^3$/min, cool air absolution moisture content: 3 g/$m^3$, blower air volume: 20 $m^3$/min, injection air flow: 1 $m^3$/min.

1.0 part of a hydrophobic silica fine particle with a BET specific surface area of 25 $m^2$/g that had been surface treated with 4 mass % hexamethyldisilazane and 0.8 parts of a hydrophobic silica fine particle with a BET specific surface area of 100 m²/g that had been surface treated with 10 mass % polydimethylsiloxane were added to 100 parts of the resulting heat-treated toner particle 1. This was then mixed with a Henschel mixer (FM-75, Nippon Coke & Engineering Co., Ltd.) at a rotational speed of 30 s$^{-1}$ for a rotation time of 10 minutes to obtain a Toner 1.

The weight-average particle diameter (D4) of the Toner 1 was 6.4 μm. TEM observation confirmed that the Toner 1 comprised a coating layer containing a 1,2-polybutadiene resin formed at the surface of a toner base particle. The physical properties of the toner are shown in Table 2.

Manufacturing Example of Toner 2: Melt Kneading Method 4.9 parts of the 1,2-polybutadiene resin D2 and 0.1 parts of the binder resin C were added to 100 parts of the toner base particle 1, and this was loaded into a Mechano Hybrid (Nippon Coke & Engineering Co., Ltd.) and mixed at a rotational speed of 160 s$^{-1}$ for a rotation time of 5 minutes to obtain a toner particle 2.

1.0 part of a hydrophobic silica fine particle with a BET specific surface area of 25 m²/g that had been surface treated with 4 mass % hexamethyldisilazane and 0.8 parts of a hydrophobic silica fine particle with a BET specific surface area of 100 m²/g that had been surface treated with 10 mass % polydimethylsiloxane were added to 100 parts of the resulting toner particle 2. This was then mixed with a Henschel mixer (FM-75, Nippon Coke & Engineering Co., Ltd.) at a rotational speed of 30 s$^{-1}$ for a rotation time of 10 minutes to obtain a Toner 2.

The weight-average particle diameter (D4) of the Toner 2 was 5.9 μm. TEM observation confirmed that the Toner 2 comprised a coating layer containing a 1,2-polybutadiene resin formed at the surface of a toner base particle. The physical properties of the toner are shown in Table 2.

Manufacturing Example of Toner 3: Melt Kneading Method

A Toner 3 was obtained as in the manufacturing example of Toner 2 except that 4.8 parts of the 1,2-polybutadiene resin D3 and 0.2 parts of the binder resin C were added to 100 parts of the toner base particle 1.

The weight-average particle diameter (D4) of the Toner 3 was 6.8 μm. TEM observation confirmed that the Toner 3 comprised a coating layer containing a 1,2-polybutadiene resin formed at the surface of a toner base particle. The physical properties of the toner are shown in Table 2.

Manufacturing Example of Toner 4: Melt Kneading Method

A Toner 4 was obtained as in the manufacturing example of Toner 2 except that 3.8 parts of the 1,2-polybutadiene resin D4 and 0.2 parts of the binder resin C were added to 100 parts of the toner base particle 1.

The weight-average particle diameter (D4) of the Toner 4 was 6.1 μm. TEM observation confirmed that the Toner 4 comprised a coating layer containing a 1,2-polybutadiene resin formed at the surface of a toner base particle. The physical properties of the toner are shown in Table 2.

Manufacturing Example of Toner 5: Melt Kneading Method

A Toner 5 was obtained as in the manufacturing example of Toner 2 except that 2.8 parts of the 1,2-polybutadiene resin D5 and 0.2 parts of the binder resin C were added to 100 parts of the toner base particle 1, loaded into a Nobilta (Hosokawa Micron Corporation), and mixed at a rotational speed of 150 s$^{-1}$ for a rotation time of 10 minutes.

The weight-average particle diameter (D4) of the Toner 5 was 6.7 μm. TEM observation confirmed that the Toner 5 comprised a coating layer containing a 1,2-polybutadiene resin formed at the surface of a toner base particle. The physical properties of the toner are shown in Table 2.

Manufacturing Example of Toner 6: Melt Kneading Method

Preparation of 1,2-polybutadiene Resin Dispersion 93.3 parts of the 1,2-polybutadiene resin D6 and 6.7 parts of the binder resin C were dissolved in a mixed solvent of 200 parts of toluene and 100 parts of isopropyl alcohol to obtain a resin solution.

The prepared 1,2-polybutadiene resin D6 solution was stirred in a Primix Corporation T.K. Homomixer at room temperature as 14 parts of a 10% aqueous ammonia solution were added dropwise for 5 minutes, and mixed for 10 minutes.

900 parts of ion-exchange water were then added dropwise at a rate of 7 parts per minute, and the phase was inverted to obtain an emulsion. 800 parts of the resulting emulsion and 700 parts of ion-exchange water were then immediately placed in a 2 L eggplant flask, and set in an evaporator equipped with a vacuum control unit with an intervening trap ball.

The eggplant flask was rotated as the organic solvent was removed with care taken to avoid bumping, after which the eggplant flask was ice cooled to obtain a dispersion. Ion-exchange water was added to adjust the solids concentration to 20%, and obtain a 1,2-polybutadiene resin D6 dispersion.

100 parts of the toner base particle 1 were circulated at a supply air temperature of 80° C. in the fluidized bed of an SFP-01 particle coating apparatus (Powrex Corporation). Next, 15.0 parts of the 1,2-polybutadiene resin D6 dispersion were sprayed into the fluidized bed of the SFP-01 particle coating apparatus (Powrex Corporation) for 60 minutes at a spray rate of 0.4 parts/min to obtain a toner particle 6.

1.0 part of a hydrophobic silica fine particle with a BET specific surface area of 25 m²/g that had been surface treated with 4 mass % hexamethyldisilazane and 0.8 parts of a hydrophobic silica fine particle with a BET specific surface area of 100 m²/g that had been surface treated with 10 mass % polydimethylsiloxane were added to 100 parts of the resulting toner particle 6. This was then mixed with a Henschel mixer (FM-75, Nippon Coke & Engineering Co., Ltd.) at a rotational speed of 30 s$^{-1}$ for a rotation time of 10 minutes to obtain a Toner 6.

The weight-average particle diameter (D4) of the Toner 6 was 6.2 μm. TEM observation confirmed that the Toner 6 comprised a coating layer containing a 1,2-polybutadiene resin formed at the surface of a toner base particle. The physical properties of the toner are shown in Table 2.

Manufacturing Example of Toner 7: Emulsion Aggregation Method

Preparation of 1,2-Polybutadiene Resin Dispersion 93.3 parts of the 1,2-polybutadiene resin D7 and 6.7 parts of the binder resin C were dissolved in a mixed solvent of 200 parts of toluene and 100 parts of isopropyl alcohol, to obtain a 1,2-polybutadiene resin D7 solution.

The prepared 1,2-polybutadiene resin D7 solution was stirred in a Primix Corporation T.K. Homomixer at room temperature as 14 parts of a 10% aqueous ammonia solution were added dropwise for 5 minutes, and mixed for 10 minutes.

900 parts of ion-exchange water were then added dropwise at a rate of 7 parts a minute, and the phase was inverted to obtain an emulsion. 800 parts of the resulting emulsion and 700 parts of ion-exchange water were then immediately placed in a 2 L eggplant flask, and set in an evaporator equipped with a vacuum control unit with an intervening trap ball.

The eggplant flask was rotated as the organic solvent was removed with care taken to avoid bumping, after which the eggplant flask was ice cooled to obtain a dispersion. Ion-exchange water was added to adjust the solids concentration to 20%, and obtain a 1,2-polybutadiene resin D7 dispersion.

Preparation of Binder Resin Dispersion

The binder resin A and binder resin B were each adjusted with ammonia to a pH of 8.5 at a compositional ratio of 80 mass % ion-exchange water, 20 mass % binder resin, and a Cavitron was operated with a heating condition of 100° C. A binder resin A dispersion and binder resin B dispersion were thus obtained (solids concentration: 20%).

Preparation of Colorant Dispersion

| C.I. Pigment Blue 15:3 | 1,000 parts |
| Anionic surfactant | 150 parts |
| Ion-exchange water | 9,000 parts |

These were mixed, and the colorant was dispersed with a high-pressure impact-type disperser.

The 50% particle diameter (d50) based on volume distribution of the colorant particles in the resulting colorant dispersion was 0.16 µm, and the colorant concentration was 23%.

Preparation of Wax Dispersion

| Fischer-Tropsch wax (maximum endothermic peak temperature (melting point): 90° C.) | 45 parts |
| Anionic surfactant | 5 parts |
| Ion-exchange water | 150 parts |

These were heated to 95° C. and dispersed with a homogenizer, and then dispersed with a pressure discharge-type Gaulin homogenizer to prepare a wax dispersion (wax concentration: 20%) in which the 50% particle diameter (d50) based on volume distribution was 210 nm.

| Binder resin A dispersion | 375.0 parts |
| Binder resin B dispersion | 125.0 parts |

These were mixed and dispersed with a homogenizer in a round stainless-steel flask. 0.15 parts of aluminum polychloride were then added thereto, and dispersion was continued with an Ultra-turrax. The following were then added.

| Colorant dispersion | 20.5 parts |
| Wax dispersion | 25.0 parts |

A further 0.05 parts of aluminum polychloride were then added, and dispersion was continued with the Ultra-turrax.

A stirrer and mantle heater were installed, and the rotation of the stirrer was adjusted so as to thoroughly agitate the slurry as the temperature was raised to 60° C. and maintained at 60° C. for 15 minutes.

The temperature was then raised at a rate of 0.05° C./min as the particle size was measured every 10 minutes with a Coulter Counter Multisizer 3 (aperture: 50 µm, registered trademark, Beckman Coulter, Inc.).

Once the 50% particle diameter based on volume distribution (d50) had reached 5.0 µm, 15.0 parts of the 1,2-polybutadiene resin D7 dispersion (additional resin) were added over the course of 3 minutes. After addition, this was maintained for 30 minutes, after which the pH was raised to 9.0 with an aqueous 5% sodium hydroxide solution.

The temperature was then raised to 96° C. at a rate of 1° C./min with the pH adjusted to 9.0 every 5° C., and maintained at 96° C.

The particle shapes and surface properties were observed every 30 minutes with an optical microscope and a scanning electron microscope (FE-SEM), and because spheronization was observed after 5 hours, the temperature was then lowered to 20° C. at 1° C./min to fix the toner particles.

The product was then filtered, thoroughly washed with ion-exchange water and dried with a vacuum drier to obtain a toner particle 7.

1.0 part of a hydrophobic silica fine particle with a BET specific surface area of 25 $m^2/g$ that had been surface treated with 4 mass % hexamethyldisilazane and 0.8 parts of a hydrophobic silica fine particle with a BET specific surface area of 100 $m^2/g$ that had been surface treated with 10 mass % polydimethylsiloxane were added to 100 parts of the resulting toner particle 7. This was then mixed with a Henschel mixer (FM-75, Nippon Coke & Engineering Co., Ltd.) at a rotational speed of 30 $s^{-1}$ for a rotation time of 10 minutes to obtain a Toner 7.

The weight-average particle diameter (D4) of the Toner 7 was 6.6 µm. TEM observation confirmed that the Toner 7 comprised a coating layer containing a 1,2-polybutadiene resin formed at the surface of a toner base particle. The physical properties of the toner are shown in Table 2.

Manufacturing Examples of Toners 8 to 16: Emulsion Aggregation Method

Toners 8 to 16 were obtained by the same operations as in the manufacturing example of Toner 7 except that the type and content of the 1,2-polybutadiene resin, the content of the binder resin C and the type and content of the wax were changed appropriately so as to be the conditions shown in Table 2.

TEM observation confirmed that the Toners 8 to 16 each comprised a coating layer containing a 1,2-polybutadiene resin formed at the surface of a toner base particle. The physical properties of the toners are shown in Table 2.

Manufacturing Example of Toner 17: Melt Kneading Method

A Toner 17 was obtained by the same operations as in the manufacturing example of Toner 1 except that the type and content of the 1,2-polybutadiene resin were changed appropriately so as to be the conditions shown in Table 2. In Toner 17, the coverage ratio of the toner base particle by the coating layer was 20%. The physical properties of the toner are shown in Table 2.

Manufacturing Example of Toner 18: Melt Kneading Method

Manufacturing Example of Polyolefin Resin Particle

A three-necked flask was purged with ethylene at room temperature, and 100 parts of norbornene and 120 parts of toluene were added. Further ethylene was then introduced and pressurized several times ($3.0 \times 10^5$ Pa) to saturate the solution with ethylene.

The pressure was set to $3.0 \times 10^5$ Pa (gauge pressure), a toluene solution of 0.1 parts of methylaluminoxane dissolved in 1.0 part of toluene was added dropwise to the flask, and the mixture was stirred for 15 minutes at 70° C.

Meanwhile, a two-necked flask was purged with nitrogen at room temperature, and 0.1 parts of methylaluminoxane was added and dissolved in 1.0 part of toluene. 0.3 parts of isopropylene(1-indenyl)cyclopentadienyl zirconium dichloride were added to the resulting toluene solution, and pre-activated by being left for 30 minutes. The pre-activated complex solution was added dropwise to the previous norbornene reaction solution.

The resulting mixture was stirred for 1 hour at 70° C., and further ethylene was then quantitatively introduced to maintain the ethylene pressure at $3.0\times10^5$ Pa and obtain a reaction product.

The resulting reaction product was gradually added dropwise to 1,000 parts of acetone and stirred for 10 minutes, after which the precipitate was filtered out. The filtrate cake was washed multiple times alternately with 10% concentration of hydrochloric acid and acetone, and then washed with ion-exchange water until the pH was neutral to obtain a polymer.

The resulting polymer was filtered out, and dried for 20 hours at a pressure of $0.2\times10^5$ Pa and a temperature of 80° C. to obtain a polyolefin resin.

10 parts of the resulting polyolefin resin were dissolved in 30 parts of toluene to prepare a solution. Meanwhile, 0.4 parts of a nonionic surfactant were dissolved in 40 parts of ion-exchange water to prepare another solution. The toluene solution of the polyolefin resin was then added dropwise at room temperature to the prepared aqueous solution of the surfactant under stirring with a Primix Corporation T.K. Homomixer. Stirring was then continued for 1 hour at room temperature to obtain an emulsion.

The resulting emulsion was gradually added dropwise at room temperature to 300 parts of methanol, and agitated for 20 minutes with a three-one motor (propeller blade).

The precipitated resin particles were filtered out, and washed 4 times with 30 parts of ion-exchange water. The resulting resin particles were then dried for 20 hours at 80° C. under $0.2\times10^5$ Pa of pressure, to obtain polyolefin resin particles. The polyolefin resin particles had a weight-average particle diameter (D4) of 100 nm, and a glass transition temperature of 75° C.

| | |
|---|---|
| Binder resin A | 75.0 parts |
| Binder resin B | 25.0 parts |
| Fischer-Tropsch wax | 5.0 parts |
| (maximum endothermic peak temperature (melting point): 90° C.) | |
| C.I. Pigment Blue 15:3 | 5.0 parts |

These materials were mixed at a rotational speed of 20 s$^{-1}$ for a rotation time of 5 minutes with a Henschel mixer (FM-75, Nippon Coke & Engineering Co., Ltd.), and then kneaded with a twin-screw kneader (PCM-30, Ikegai Ironworks Corp) set to 150° C.

The kneaded product was cooled, and crushed to 1 mm or less with a hammer mill to obtain a crushed product.

The resulting crushed product was pulverized with a mechanical pulverizer (T-250, Turbo Kogyo Co., Ltd.). This was then classified with a Faculty F-300 (Hosokawa Micron Corporation) to obtain a toner base particle 18. The operating conditions were classifying rotor speed 130 s$^{-1}$, dispersion rotor speed 120 s$^{-1}$.

5.0 parts of a polyolefin resin particle were added to 100 parts of the resulting toner base particles 18, and this was loaded into a Mechano Hybrid (Nippon Coke & Engineering Co., Ltd.) and mixed at a rotational speed of 160 s$^{-1}$ for a rotation time of 5 minutes to obtain a toner particle 18.

1.0 part of a hydrophobic silica fine particle with a BET specific surface area of 25 m$^2$/g that had been surface treated with 4 mass % hexamethyldisilazane and 0.8 parts of a hydrophobic silica fine particle with a BET specific surface area of 100 m$^2$/g that had been surface treated with 10 mass % polydimethylsiloxane were added to 100 parts of the resulting toner particle 18. This was then mixed with a Henschel mixer (FM-75, Nippon Coke & Engineering Co., Ltd.) at a rotational speed of 30 s$^{-1}$ for a rotation time of 10 minutes to obtain a Toner 18.

The weight-average particle diameter (D4) of the Toner 18 was 6.5 μm. TEM observation confirmed that the Toner 18 comprised a coating layer containing a cyclic polyolefin resin formed at the surface of a toner base particle. The physical properties of the toner are shown in Table 2.

TABLE 2

| | Formulation | | | | | | Coating layer | | | | | | Preparation method | |
|---|---|---|---|---|---|---|---|---|---|---|---|---|---|---|
| | Binder resin | | | Wax | | | 1,2-polybutadiene resin | | binder resin C | | | | | |
| Toner No. | Resin A (parts) | Resin B (parts) | Resin C (parts) | Type | Melting point (° C.) | Content (parts) | Type | Content (parts) | Content (parts) | Average thickness (μm) | Coverage ratio (%) | Average circularity | D4 (μm) | Preparation method | Heat treatment |
| 1 | 75.0 | 25.0 | 0.0 | W1 | 90 | 5.0 | D1 | 5.0 | 0.0 | 0.3 | 100 | 0.975 | 6.4 | P1 | Yes |
| 2 | 75.0 | 25.0 | 0.0 | W1 | 90 | 5.0 | D2 | 4.9 | 0.1 | 0.4 | 97 | 0.967 | 5.9 | P1 | No |
| 3 | 75.0 | 25.0 | 0.0 | W1 | 90 | 5.0 | D3 | 4.8 | 0.2 | 0.6 | 95 | 0.961 | 6.8 | P1 | No |
| 4 | 75.0 | 25.0 | 0.0 | W1 | 90 | 5.0 | D4 | 3.8 | 0.2 | 0.5 | 93 | 0.965 | 6.1 | P1 | No |
| 5 | 75.0 | 25.0 | 0.0 | W1 | 90 | 5.0 | D5 | 2.8 | 0.2 | 0.5 | 92 | 0.953 | 6.7 | P1 | No |
| 6 | 75.0 | 25.0 | 0.0 | W1 | 90 | 5.0 | D6 | 2.8 | 0.2 | 0.5 | 92 | 0.963 | 6.2 | P1 | No |
| 7 | 75.0 | 25.0 | 0.0 | W1 | 90 | 5.0 | D7 | 2.8 | 0.2 | 0.5 | 92 | 0.955 | 6.6 | P2 | No |
| 8 | 75.0 | 25.0 | 0.0 | W1 | 90 | 5.0 | D8 | 2.8 | 0.2 | 0.5 | 92 | 0.961 | 6.3 | P2 | No |
| 9 | 75.0 | 25.0 | 0.0 | W1 | 90 | 5.0 | D9 | 1.9 | 0.1 | 0.3 | 92 | 0.957 | 6.5 | P2 | No |
| 10 | 75.0 | 25.0 | 0.0 | W1 | 90 | 5.0 | D9 | 4.7 | 0.3 | 0.7 | 92 | 0.960 | 6.4 | P2 | No |
| 11 | 75.0 | 25.0 | 0.0 | W1 | 90 | 5.0 | D9 | 0.9 | 0.1 | 0.1 | 92 | 0.959 | 5.9 | P2 | No |
| 12 | 75.0 | 25.0 | 0.0 | W1 | 90 | 5.0 | D9 | 6.6 | 0.4 | 1.0 | 92 | 0.968 | 6.4 | P2 | No |
| 13 | 75.0 | 25.0 | 0.0 | W1 | 90 | 5.0 | D9 | 9.4 | 0.6 | 2.0 | 90 | 0.968 | 6.5 | P2 | No |
| 14 | 75.0 | 25.0 | 0.0 | W1 | 90 | 5.0 | D9 | 18.4 | 1.6 | 2.0 | 70 | 0.969 | 6.3 | P2 | No |
| 15 | 75.0 | 25.0 | 0.0 | W1 | 90 | 5.0 | D9 | 27.0 | 3.0 | 2.0 | 60 | 0.967 | 6.2 | P2 | No |
| 16 | 0.0 | 0.0 | 100.0 | W2 | 110 | 5.0 | D9 | 20.0 | 20.0 | 2.0 | 50 | 0.961 | 6.6 | P2 | No |

TABLE 2-continued

| | Formulation | | | | | | Coating layer | | | | | | Preparation method | |
| | Binder resin | | | Wax | | 1,2-polybutadiene resin | binder resin | | | | | | | |
| Toner No. | Resin A (parts) | Resin B (parts) | Resin C (parts) | Type | Melting point (° C.) | Content (parts) | Type | Content (parts) | Content (parts) | Average thickness (μm) | Coverage ratio (%) | Average circularity | D4 (μm) | Preparation method | Heat treatment |
|---|---|---|---|---|---|---|---|---|---|---|---|---|---|---|---|
| 17 | 75.0 | 25.0 | 0.0 | W1 | 90 | 5.0 | D1 | 0.1 | 0.0 | 0.3 | 20 | 0.974 | 5.8 | P1 | Yes |
| 18 | 75.0 | 25.0 | 0.0 | W1 | 70 | 5.0 | — | — | — | 0.3 | 100 | 0.963 | 6.5 | P1 | No |

As the wax type in Table 2, W represents Fischer-Tropsch wax and W2 represents ester wax.

As the preparation method, P1 represents the melt kneading method and P2 represents the emulsion aggregation method.

Manufacturing Example of Magnetic Core Particle 1
Step 1 (Weighing and Mixing Step)

| | |
|---|---|
| $Fe_2O_3$ | 62.7 parts |
| $MnCO_3$ | 29.5 parts |
| $Mg(OH)_2$ | 6.8 parts |
| $SrCO_3$ | 1.0 part |

A ferrite starting material was weighed comprising these materials in the compositional ratios given. This was then pulverized and mixed for 5 hours in a dry vibration mill using stainless steel beads ⅛ inch in diameter.

Step 2 (Pre-Baking Step)

The resulting pulverized product was made into roughly 1 mm-square pellets with a roller compactor. Coarse powder was removed from the pellets with a 3 mm mesh vibrating sieve, and fine powder was then removed with an 0.5 mm mesh vibrating sieve, and the pellets were baked for 4 hours at 1,000° C. in a burner-type firing furnace in a nitrogen atmosphere (oxygen concentration 0.01 vol %) to prepare a pre-baked ferrite. The composition of the resulting pre-baked ferrite was as follows.

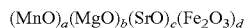

$(MnO)_a(MgO)_b(SrO)_c(Fe_2O_3)_d$

In the formula, a=0.257, b=0.117, c=0.007, d=0.393.

Step 3 (Pulverization Step)

The resulting pre-baked ferrite was pulverized to about 0.3 mm in a crusher, and 30 parts of water were added per 100 parts of the pre-baked ferrite, which was then pulverized for 1 hour in a wet ball mill with zirconia beads ⅛ inch in diameter. The resulting slurry was then pulverized for 4 hours in a wet ball mill using alumina beads 1/16 inch in diameter, to obtain a ferrite slurry (finely pulverized pre-baked ferrite).

Step 4 (Granulation Step)

1.0 part of ammonium polycarboxylate as a dispersant and 2.0 parts of polyvinyl alcohol as a binder per 100 parts of the pre-baked ferrite were added to the ferrite slurry, which was then granulated into spherical particles in a spray dryer (manufactured by Ohkawara Kakohki Co., Ltd.). The particle size of the resulting particles was adjusted, and they were heated for 2 hours at 650° C. in a rotary film to remove the organic components of the dispersant and binder.

Step 5 (Baking Step)

In order to control the firing atmosphere, the temperature was raised from room temperature to 1,300° C. in a nitrogen atmosphere (oxygen concentration 1.00 vol %) in an electric furnace over the course of 2 hours, and the particles were then baked for 4 hours at 1,150° C. The temperature was then lowered to 60° C. over the course of 4 hours and returned from a nitrogen atmosphere to air, and the particles were removed at a temperature of 40° C. or less.

Step 6 (Selection Step)

Aggregated particles were broken up, low-magnetic particles were excluded with a magnetic dressing, and coarse particles were removed by sieving with a 250 μm mesh sieve to obtain a magnetic core particle 1 with a 50% particle diameter (d50) based on volume distribution of 37.0 μm.

Preparation of Coating Resin 1

| | |
|---|---|
| Cyclohexyl methacrylate monomer | 26.8 mass % |
| Methyl methacrylate monomer | 0.2 mass % |
| Methyl methacrylate macromonomer | 8.4 mass % |
| (macromonomer with weight-average molecular weight of 5,000 having methacryloyl group at one end) | |
| Toluene | 31.3 mass % |
| Methyl ethyl ketone | 31.3 mass % |
| Azobisisobutyronitrile | 2.0 mass % |

Of these materials, the cyclohexyl methacrylate monomer, methyl methacrylate monomer, methyl methacrylate macromonomer, toluene and methyl ethyl ketone were placed in a four-necked separable flask with an attached reflux condenser, thermometer, nitrogen introduction pipe and stirring apparatus, and nitrogen gas was introduced to purge the interior of the system. This was then heated to 80° C., and the azobisisobutyronitrile was added and refluxed for 5 hours to polymerize the mixture. Hexane was poured into the resulting reaction product to precipitate a copolymer, and the precipitate was filtered out and vacuum dried to obtain a coating resin 1.

Next, 30 parts of the coating resin 1 were dissolved in 40 parts of toluene and 30 parts of methyl ethyl ketone to obtain a polymer solution 1 (solids concentration 30 mass %).

Preparation of Coating Resin Solution 1

| | |
|---|---|
| Polymer solution 1 (resin solids concentration 30%) | 33.3 mass % |
| Toluene | 66.4 mass % |
| Carbon black | 0.3 mass % |

(primary particle size 25 nm, nitrogen adsorption specific surface area 94 m²/g, DBP oil absorption 75 mL/100 g)

These materials were dispersed for 1 hour with a paint shaker using zirconia beads 0.5 mm in diameter. The resulting dispersion was filtered with a 5.0 μm membrane filter to obtain a coating resin solution 1.

Manufacturing Example of Magnetic Carrier 1 Resin Coating Step

The magnetic core particle 1 and coating resin solution 1 were loaded into a vacuum degassing kneader maintained at normal temperature (the loaded amount of the coating resin solution 1 was 2.5 parts (as the resin component) per 100 parts of the magnetic core particle 1). This was then stirred for 15 minutes at a rotational speed of 30 rpm, and once at least a specific amount of the solvent (80%) had evaporated, the temperature was raised to 80° C. with reduced pressure mixing, the toluene was removed over the course of 2 hours, and the mixture was cooled. A magnetic dressing was used to separate the low magnetic particles from the resulting magnetic carrier, which was then passed through a 70 μm sieve and classified with an air classifier to obtain a magnetic carrier 1 with a 50% particle diameter (d50) based on volume distribution of 38.2 μm.

Manufacturing Example of Two-Component Developer 1

8.0 parts of the Toner 1 were added to 92.0 parts of the magnetic carrier 1, and mixed at a rotational speed of $0.5 \text{ s}^{-1}$ for a rotation time of 5 minutes with a V-type mixer (V-10, Tokuju Co., Ltd.) to obtain a two-component developer 1.

Manufacturing Examples of Two-Component Developers 2 to 18

Two-component developers 2 to 18 were obtained by the same operations as in the manufacturing example of the two-component developer 1 except that the Toner 1 was replaced with the Toners 2 to 18.

Example 1

A modified Canon Inc. imageRunner Advance C9280 Pro digital commercial printer was used as the image-forming device. The developing devices of the cyan and/or magenta positions were filled with the two-component developer 1, and images were formed on paper with the desired toner laid-on level, and evaluated as follows.

The device was modified so that the process speed, the DC voltage $V_{DC}$ of the developer bearing member, the charging voltage $V_D$ of the electrostatic latent image-bearing member, the laser power and the transfer current could be set at will.

For the image output evaluation, FFh images (solid images) were output with the desired image ratio. "FFh" is a value obtained by displaying 256 gradations in hexadecimal notation, with 00h being the first of the 256 gradations (white background) and FFh being the 256th of the 256 gradations (solid part).

The images were evaluated based on the following evaluation method, with the results shown in Table 3.

Evaluation 1: Charge-Up Resistance

Paper: CS-680 (68.0 g/m²) (purchased from Canon Marketing Japan Inc.)

Toner laid-on level on paper: 0.35 mg/cm² (FFh image)

Testing environment: Normal temperature, low humidity environment (25° C./5% RH, hereinafter referred to as "N/L")

As an durable image output test, 5,000 sheets were output on A4 paper using an FFh output band chart with an image ratio of 0.1%. A 10 cm² image was then positioned in the center of the A4 paper, and the image density after output was measured. Next, 7,000 sheets were output on A4 paper using an FFh output band chart with an image ratio of 1.0%, after which a 10 cm² image was positioned in the center of the A4 paper, and the image density after output was measured. The density difference between these two evaluation images was then evaluated according to the following standard.

Evaluation Standard

A: Density difference less than 0.10 (Excellent)

B: Density difference at least 0.10 and less than 0.20 (Good)

C: Density difference at least 0.20 and less than 0.30 (Acceptable)

D: Density difference at least 0.30

Evaluation 2: Charging Stability (Charge Retention Rate)

The toner on the electrostatic latent image-bearing member was collected by suction with a metal cylindrical tube and a cylindrical filter, to calculate the triboelectrical charge quantity and laid-on level of the toner.

Figure 2:
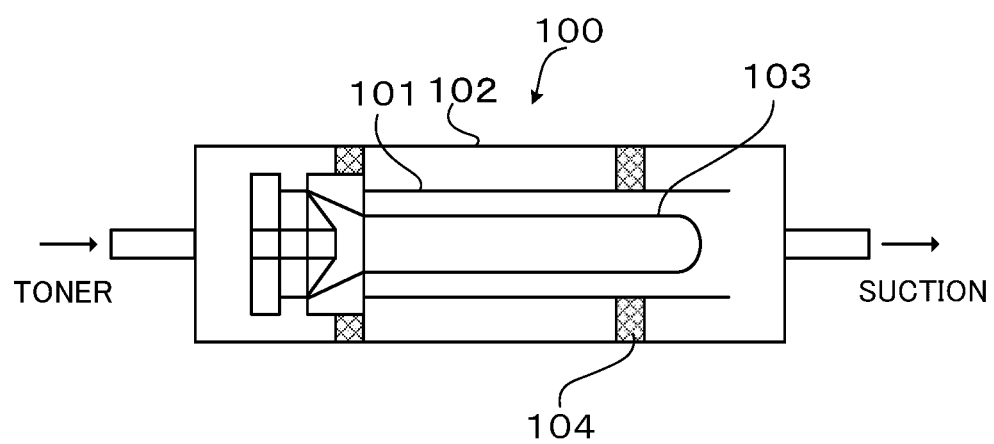
FIG. 2 is a schematic of a Faraday cage.

Specifically, the triboelectrical charge quantity and laid-on level of the toner on the electrostatic latent image-bearing member were measured with a Faraday cage such as that shown in FIG. 2.

The toner on the electrostatic latent image-bearing member was air suctioned using a Faraday cage 100 comprising metal tubes with different shaft diameters arranged coaxially as inner and outer double cylinders 101, 102, together with a filter 103 for accepting toner inside the inner cylinder 101.

In the Faraday cage 100, the inner cylinder 101 and outer cylinder 102 are insulated by an insulating member 104, and when toner is taken into the filter, the charge quantity Q of the toner causes electrostatic induction. If a charged body with a charge quantity Q is placed in this inner cylinder, it is as if a metal cylinder with the charge quantity Q is present due to the electrostatic induction. This induced charge quantity was measured with an electrometer (Keithley 6517A, Keithley Instruments, Inc.), and the charge quantity Q (mC) was divided by the toner mass M (kg) in the inner cylinder (Q/M) to determine the triboelectric charge quantity of the toner.

The toner laid-on level was determined by measuring the suctioned area S, and dividing the toner mass M (kg) by the suctioned area S (cm²).

Before the toner layer formed on the electrostatic latent image-bearing member could be transferred to the intermediate transfer body, the rotation of the electrostatic latent image-bearing member was stopped, and the toner of the toner image on the electrostatic latent image-bearing member was directly air suctioned and measured.

$$\text{Toner laid-on level (mg/cm}^2\text{)}=M/S$$

$$\text{Toner triboelectric charge quantity (mC/kg)}=Q/M$$

This image-forming device was adjusted so that the toner laid-on level on the electrostatic latent image-bearing member was 0.35 mg/cm² in a high-temperature, high-humidity environment (32.5° C., 80% RH), and the toner was collected by suction with the metal cylindrical tubes and cylindrical filter described above. The charge quantity Q that accumulated on the condenser through the metal cylindrical tubes and mass M of the collected toner were measured, and the charge quantity Q/M (mC/kg) per unit mass was calculated and given as the charge quantity Q/M (mC/kg) per unit mass on the electrostatic latent image-bearing member (initial evaluation).

Following this evaluation (initial evaluation), the developing device was removed from the unit and left standing for 48 hours in a high-temperature, high-humidity environment (32.5° C., 80% RH). After standing, the developing device was once again mounted on the unit, and the charge quantity Q/M per unit mass on the electrostatic latent image-bearing member was measured at the same DC voltage $V_D$ as in the initial evaluation (post-standing evaluation).

Given 100% as the Q/M per unit mass on the electrostatic latent image-bearing member in the initial evaluation above, the charge quantity Q/M retention rate per unit mass on the electrostatic latent image-bearing member after 48 hours' standing (post-standing evaluation) was calculated (post-standing evaluation/initial evaluation×100), and judged according to the following standard.

A: Retention rate at least 90% (Excellent)
B: Retention rate at least 80% and less than 90% (Good)
C: Retention rate at least 70% and less than 80% (Acceptable)
D: Retention rate less than 70%

Evaluation 3: Durability
Paper: CS-680 (68.0 g/m²) (purchased from Canon Marketing Japan Inc.)
Toner laid-on level on paper: 0.35 mg/cm² (FFh image)
Testing environment: High-temperature, high-humidity environment (30° C./80% RH, hereinafter referred to as "H/H")

As an durable image output test, 5,000 sheets were output on A4 paper using an FFh output band chart with an image ratio of 0.1%. A 10 cm² image was then positioned in the center of the A4 paper, and the image density after output was measured. Next, 1,000 sheets were output on A4 paper using an FFh output band chart with an image ratio of 40.0%, after which a 10 cm² image was positioned in the center of the A4 paper, and the image density after output was measured. The density difference between these two evaluation images was then evaluated according to the following standard.

Evaluation Standard
A: Density difference less than 0.10 (Excellent)
B: Density difference at least 0.10 and less than 0.15 (Good)
C: Density difference at least 0.15 and less than 0.25 (Acceptable)
D: Density difference at least 0.25

Evaluation 4: Low-Temperature Fixability
Paper: CS-680 (68.0 g/m²) (purchased from Canon Marketing Japan Inc.)
Toner laid-on level on paper: 1.20 mg/cm²
Evaluation image: a 10 cm² image was positioned in the center of A4 paper
Fixing test environment: Low-temperature, low-humidity environment: 15° C./10% RH, hereinafter referred to as "L/L"

The DC voltage $V_{DC}$ of the developer bearing member, the charging voltage $V_D$ of the electrostatic latent image-bearing member and the laser power were adjusted to achieve the toner laid-on level above on the paper, and low-temperature fixability was evaluated with the process speed set to 450 mm/sec and the fixation temperature set to 130° C.

The value for image density decrease rate was taken as an indicator of low-temperature fixability.

The image density decrease rate was calculated by first measuring the image density at the center using an X-Rite color reflection densitometer (500 Series, X-Rite Inc.). 4.9 kPa (50 g/cm²) of load was then applied to the area of image density measurement, the fixed image was rubbed (5 times back and forth) with Silbon paper, and the image density was measured again. The decrease rate (%) in image density after rubbing was then calculated.

The evaluation standard was as follows.
A: Image density decrease rate less than 1.0% (Excellent)
B: Image density decrease rate at least 1.0% and less than 4.0% (Good)
C: Image density decrease rate at least 4.0% and less than 7.0% (Acceptable)
D: Image density decrease rate at least 7.0%

Examples 2 to 16, Comparative Examples 1 and 2

Evaluations were performed as in Example 1 using the two-component developers 2 to 18 shown in Table 3. The evaluation results are shown in Table 3.

TABLE 3

| | Two-component developer | | Evaluation 1 Charge-up resistance | | Evaluation 2 Charging stability Retention | | Evaluation 3 Durability | | Evaluation 4 Low-temperature fixability Density decrease | |
|---|---|---|---|---|---|---|---|---|---|---|
| | No. | Toner No. | Density difference | Evaluation | rate (%) | Evaluation | Density difference | Evaluation | rate (%) | Evaluation |
| Example 1 | 1 | 1 | 0.05 | A | 95 | A | 0.03 | A | 0.5 | A |
| Example 2 | 2 | 2 | 0.03 | A | 96 | A | 0.02 | A | 1.1 | B |
| Example 3 | 3 | 3 | 0.04 | A | 93 | A | 0.01 | A | 1.2 | B |
| Example 4 | 4 | 4 | 0.06 | A | 88 | B | 0.03 | A | 1.9 | B |
| Example 5 | 5 | 5 | 0.07 | A | 89 | B | 0.03 | A | 1.4 | B |
| Example 6 | 6 | 6 | 0.08 | A | 83 | B | 0.01 | A | 1.9 | B |
| Example 7 | 7 | 7 | 0.06 | A | 82 | B | 0.03 | A | 3.0 | B |
| Example 8 | 8 | 8 | 0.11 | B | 81 | B | 0.02 | A | 3.5 | B |
| Example 9 | 9 | 9 | 0.11 | B | 84 | B | 0.13 | B | 3.7 | B |
| Example 10 | 10 | 10 | 0.12 | B | 83 | B | 0.12 | B | 3.4 | B |
| Example 11 | 11 | 11 | 0.18 | B | 81 | B | 0.14 | B | 3.6 | B |
| Example 12 | 12 | 12 | 0.19 | B | 82 | B | 0.11 | B | 2.9 | B |
| Example 13 | 13 | 13 | 0.18 | B | 84 | B | 0.16 | C | 3.1 | B |
| Example 14 | 14 | 14 | 0.25 | C | 81 | B | 0.20 | C | 3.4 | B |
| Example 15 | 15 | 15 | 0.26 | C | 75 | C | 0.19 | C | 3.9 | B |
| Example 16 | 16 | 16 | 0.27 | C | 73 | C | 0.18 | C | 6.0 | C |

TABLE 3-continued

| | Two-component developer No. | Toner No. | Evaluation 1 Charge-up resistance | | Evaluation 2 Charging stability | | Evaluation 3 Durability | | Evaluation 4 Low-temperature fixability | |
|---|---|---|---|---|---|---|---|---|---|---|
| | | | Density difference | Evaluation | Retention rate (%) | Evaluation | Density difference | Evaluation | Density decrease rate (%) | Evaluation |
| Comparative Example 1 | 17 | 17 | 0.35 | D | 60 | D | 0.30 | D | 8.0 | D |
| Comparative Example 2 | 18 | 18 | 0.37 | D | 90 | A | 0.01 | A | 0.9 | A |

The present invention provides a toner having stable charging performance in both high-humidity and low-humidity environments, as well as excellent low-temperature fixability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-228852, filed Nov. 25, 2016, which is hereby incorporated by reference herein in its entirety.

What is claimed is:

1. A toner comprising a toner particle, said toner particle comprising:
   a toner base particle containing a binder resin and a wax; and
   a coating layer containing a 1,2-polybutadiene resin at the surface of the toner base particle, wherein
   the 1,2-polybutadiene resin has a 1,2-syndiotactic structure,
   a percentage content of the 1,2-syndiotactic structure in the 1,2-polybutadiene resin is at least 30 mass %, and
   a coverage ratio of the toner base particle by the coating layer is at least 50%.

2. The toner according to claim 1, wherein the coating layer contains the 1,2-polybutadiene resin in the amount of at least 90 mass % of the coating layer.

3. The toner according to claim 1, wherein a coverage ratio of the toner base particle by the coating layer is at least 90%.

4. The toner according to claim 1, wherein an average thickness of the coating layer is 0.1 to 1.0 μm.

5. The toner according to claim 1, wherein the percentage content of a monomer unit represented by Formula (1) in the 1,2-polybutadiene resin is at least 90 mass %

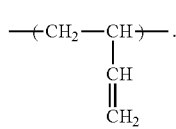
(1)

6. The toner according to claim 1, wherein a dielectric loss tangent of the 1,2-polybutadiene resin is 2.0 to 5.0.

7. The toner according to claim 1, wherein a melting point of the 1,2-polybutadiene resin is 70° C. to 110° C.

* * * * *